US006539083B1

(12) United States Patent
Churchman

(10) Patent No.: US 6,539,083 B1
(45) Date of Patent: Mar. 25, 2003

(54) INDUCTIVE COIN VALIDATION SYSTEM AND PAYPHONE USING SUCH SYSTEM

(75) Inventor: James Churchman, Llysworney (GB)

(73) Assignee: Marconi Communications Limited, Coventry (GB)

( * ) Notice: Subject to any disclaimer, the term of this patent is extended or adjusted under 35 U.S.C. 154(b) by 0 days.

(21) Appl. No.: 09/484,377

(22) Filed: Jan. 14, 2000

(51) Int. Cl.[7] .............................................. H04M 17/00

(52) U.S. Cl. ....................... 379/146; 379/147; 379/148; 194/316; 194/324; 194/320

(58) Field of Search ................................ 194/317, 318, 194/319, 328, 314, 320, 322, 324, 344, 316; 379/143, 145, 146, 147, 148, 149, 150, 151; 324/672, 674

(56) References Cited

U.S. PATENT DOCUMENTS

| | | | | |
|---|---|---|---|---|
| 4,242,539 | A | | 12/1980 | Hashimoto |
| 4,353,453 | A | | 10/1982 | Partin et al. |
| 4,441,602 | A | | 4/1984 | Ostroski et al. |
| 4,742,903 | A | | 5/1988 | Trummer |
| 4,819,780 | A | | 4/1989 | Trummer et al. |
| 4,936,436 | A | | 6/1990 | Keltner |
| 5,575,057 | A | | 11/1996 | Seitz |
| 5,687,829 | A | * | 11/1997 | Churchman ................. 194/317 |

FOREIGN PATENT DOCUMENTS

| | | | |
|---|---|---|---|
| EP | 0 304 535 | A2 | 3/1989 |
| EP | 0 692 773 | A2 | 7/1992 |
| EP | 0 572 847 | A1 | 12/1993 |
| EP | 0 918 306 | A3 | 5/1999 |
| GB | 2 062 327 | A | 5/1981 |
| GB | 2 266 804 | A | 11/1993 |
| WO | WO 95/19018 | | 7/1995 |

* cited by examiner

*Primary Examiner*—Rexford Barnie
(74) *Attorney, Agent, or Firm*—Kirschstein, et al

(57) ABSTRACT

A coin validation arrangement, usable for example in pay telephones, uses one or more inductive sensors having a small effective magnetic field so that the inductive sensor responds only to the material of a strip across the coin. Preferably a plurality of inductive sensors are used, mounted at different heights above the floor of a coin guide, at different positions along the coin path. At each position along the coin path there may be either one or a plurality of inductive sensors. Preferably the inductive sensors are surface mount inductors on a printed circuit board which forms part of one wall of the coin guide. Such arrangements are particularly useful for recognizing coins having an outer ring made of a different material from the central disc, and for distinguishing such coins from uniform composition coins.

49 Claims, 9 Drawing Sheets

INDUCTIVE COIN VALIDATION SYSTEM AND PAYPHONE USING SUCH SYSTEM

BACKGROUND OF THE INVENTION

The present invention relates to a system and method for validating coins, and to pay telephones using the system or method. The term "coin" is not limited to coins issued as currency on behalf of Governments, but also covers any other tokens which it may be desirable to identify automatically, such as private currencies circulating within large organizations or telephone call tokens issued by telephone companies.

Coin validation systems are used in a wide variety of machines, such as in turnstiles, automatic vending machines and automatic ticket issuing machines, and pay telephones. A wide variety of methods are known for sensing coins and for processing the outputs of the sensors. For example, input coins may be sensed by their influence on a capacitor or an inductor, they may be detected by optical sensors, and the nature of the material of the coin may be examined by causing the coin to vibrate and examining the nature of the vibrations.

The normal use of inductive sensors is to provide a manner of investigating the nature of the material which an input coin is made from. If the coin passes through the field generated by an inductor, so that the coin affects the inductance of the inductor, a ferromagnetic coin will tend to increase the inductance whereas a diamagnetic coin will tend to decrease the inductance. Additionally, if the magnetic field from the inductor is continually fluctuating, eddy currents generated in an electrically conductive coin will tend to reduce the effective inductance of the inductor. These effects can oppose each other. For example, if a coin is electrically conductive and also ferromagnetic or paramagnetic, then its ferromagnetism or paramagnetism will tend to increase the inductance of the inductor whereas its electrical conductivity will tend to decrease the inductance of the inductor owing to the eddy currents. The relative magnitudes of these opposing effects, and hence the net effect of the coin, will depend on various factors including the frequency of fluctuation of the magnetic field. In general, inductive sensing systems can be divided into "high frequency" systems, in which the magnetic field oscillates at a frequency of at least 100 kHz, and in which the effect of a coin on the inductance is almost entirely due to eddy currents, and "low frequency" systems in which the magnetic field oscillates at no more than 75 kHz, and in which the magnetic nature of any ferromagnetic coin material has a significant effect on the inductance of the sensor. The magnetic effect of a paramagnetic material to increase the effective inductance and the magnetic effect of diamagnetic material to reduce the inductance are both so small that the effect of eddy currents normally predominates unless the oscillation frequency is very low (less than about 10 kHz).

In high frequency systems the change of the inductance of the sensor can be used simply to detect the presence or absence of a coin at the position of the sensor, or the magnitude of the change in inductance can be measured. The magnitude of the change in inductance will depend, for example, on the degree to which the coin entirely overlaps the coil, the electrical resistivity of the material from which the coin is made, and perhaps to some extent the pattern embossed on the face of the coin. In a low frequency system, the direction of the change in inductance can be used to identify whether a coin is ferromagnetic.

GB Patent No. A-2055498 proposes a system using two coin sensors, each of which is a pair of coils arranged one on each side of the coin path, with one of the coils being an oscillating coil and the other being a receiving coil. In one sensor the coils are about the same size as the height of the coin path, which is considered to be the diameter of the largest diameter coin which passes along the coin path. The oscillating coil of this sensor is energized with a low frequency (e.g., 10 kHz), which is stated to be suitable for discriminating the material of the coin. The other sensor uses relatively small coils (it proposes a range of 10 to 30 mm for the height of the coil), arranged at the top of the coin path and extending down sufficiently that its field interacts with the smallest diameter coin expected in the coin path, but not extending all the way down to the bottom of the coin path. The oscillating coil of this sensor is excited by a high frequency (e.g., 100 kHz). The extent to which the sensor is affected by a coin depends on the degree to which the mass of metal of the coin occupies the area of the electromagnetic field between the coils, and therefore the level of signal received in the receive coil is a measure of coin diameter.

WO Patent No. A-87/00662 proposes a system which is stated to be "high frequency" although no specific frequency is mentioned. It proposes an arrangement of several coils at different heights above the bottom of a coin path. No dimensions for the coils are given, but it is stated that each sensor is arranged so that it is influenced to some extent by coins whose diameter lies in a region attributed to the sensor, whereas the sensor is not influenced by coins whose diameter lies under this region and is influenced by a maximum extent by coins whose diameter lies above this region. Accordingly, the arrangement of several sensors at different heights provides an arrangement for discriminating coins of different diameters.

GB Patent No. A-2169429 proposes an arrangement in which three inductive sensor coils are used for coin validation. Two of these are placed alongside the coin path, whereas the third is placed across the coin path so that the coin passes through the windings of the coil. It is stated that with the coils placed alongside the coin path, coin discrimination improves with frequency, coil frequencies of 100 kHz and 160 kHz are proposed, and it is stated that the change in impedance of a coil occurs by virtue of skin effect type eddy current being induced by the coil in the coin (at least in respect of a coil alongside the coin path). Of the two coils arranged alongside the coin path, one is arranged so that its diameter is generally (but not always) larger than the maximum diameter of coins that pass along the coin path. It is stated that the whole of the coin under test occludes this coil. The other coil alongside the coin path is disposed on the opposite side of the coin path and is placed offset above the floor of the coin path such that only the upper part of the coin under test occludes it. It is stated that the effect of the coin on the first coil provides a parameter indicative of the size, metallic content and the embossed pattern of the coin. It is not stated what the effect of the coin on the second coil indicates. However, it is stated that the coin of particular denomination, a substantially unique set of effects of the coin on the coils is produced.

GB Patent No. A-2045498 proposes an inductive sensor for detecting coin diameter. This uses an oblong inductor mounted so that the smallest acceptable coin overlaps the lower end of the inductor and the largest acceptable coin does not extend above the upper end of the inductor. The inductor is connected to an oscillator circuit which should oscillate at a high frequency (e.g. above 75 kHz), and the normal oscillating frequency in the absence of a coin is proposed to be 600 to 700 kHz, in order that the oscillating magnetic field penetrates only the surface of the coin under test.

EP Patent No. A-0164110 proposes a system using two sensors, each of which comprises a pair of coils arranged one on each side of the coin path. One coil of each pair is an oscillator coil, connected to an oscillator so as to generate oscillating magnetic fields, and the other coil of each pair is a receiving coil. The frequencies of the magnetic fields are stated to be low enough to cause the magnetic fluxes to pass through the coins, but no particular values for the frequency are proposed. It is proposed that the coin material can be discriminated by measuring the maximum signal obtained from one of the received coils. It is proposed that coin diameter is discriminated by measuring the strength of the signals from the two receiving coils at the point, when the coin is between the two sensors and affecting both of them, when the strengths of these signals cross over. It is stated that the various coils are preferably, but do not need to be, the same diameter as each other, but no other information is given about the diameters of the coils. However, from the drawings of EP Patent No. A-0164110 it appears that it is contemplated that the coil diameter is approximately the same as the diameter of a relatively small coin which is expected to pass along the coin path.

EP Patent No. A-0109057 proposes a system in which a coin is stopped briefly at a testing station, at which point it is between two capacitor plates and adjacent an inductor. No information is given concerning how the effect of the coin on the inductance of the inductor is measured and this is left to the choice of the person skilled in the art. However, it is stated that the inductive sensor is smaller than the smallest diameter coin which is to be identified, and it is illustrated as being position immediately above the floor of the coin path at the position where the coin is held stationary and as being just smaller than the smallest coin.

GB Patent No. A-2096812 proposes a system in which a coin is held stationary next to an inductive sensor, and is subjected to a high frequency signal (greater than or equal to 100 kHz) such that there is substantially no penetration of the signal into the coin, and also subjected to a low frequency signal (e.g., having a frequency in the region 1 kHz to 75 kHz) which penetrates into or through the coin and can be used to provide a measurement of the characteristics of the material of the coin. The device is arranged so that when the coin is held stationary, the distance between the coin and the coil depends on the diameter of the coin. It is preferred that the coil has a diameter which is smaller than the diameter of the smallest acceptable coin.

SUMMARY OF THE INVENTION

According to one aspect of the present invention a coin validation system is proposed having at least one inductive sensor the effective field of which is substantially smaller (in the height direction of a coin normal to the coin path) than the diameter of the smallest acceptable coin, and the magnitude of the effect of a coin on the sensor (or on a combination of sensors) is analyzed to distinguish between different coins (that is to say, the sensor is not used simply to detect the presence or absence of a coin). Preferably the size of the effective field is also small in the direction parallel to the coin path, but it is not necessary for the effective field to have the same size in this direction as in the height direction. Preferably the sensor (or at least one of the sensors) is positioned so that the whole of its effective magnetic field is spaced from the top of the largest diameter acceptable coin, and part of the effective field interacts with even the smallest diameter acceptable coin. Thus, the sensor can be used to analyze the construction and composition of the largest diameter acceptable coin, but might act only as a diameter checker on the smallest diameter acceptable coin.

Typically, a coin guide will be provided to guide an input coin along a predetermined coin path past the sensor or sensors. Normally a coin insertion slot is provided, through which coins can be input into the coin guide at the beginning of the coin path. The dimensions of the coin insertion slot will define a maximum diameter and a maximum thickness for the input coin.

This system will respond to the material from which an input coin is made, and can be used both with high frequency oscillating systems (so that it responds to the electrical resistivity of the material) or to low frequency oscillating systems (so that is responds at least in part to the magnetic nature of the material of the coin), although it is preferred to use it with low frequency oscillating systems. This aspect of the invention can be used both in systems where the coin is held stationary while its material is sensed using the inductive sensors and in systems where the coin moves through the field of the inductive sensor and its material is detected as it moves, but it is preferred to use it with systems in which the coin is sensed as it moves.

Owing to the small size of the effective magnetic field, the inductive sensor does not respond to the nature of the material of the coin as a whole, but responds to the nature of the material of a spot on the coin (in the case where the coin is held stationary), or a “slice” through the coin (in the case where the coin moves), at a height above the floor of the coin path corresponding to the position of the effective field. Assuming that the composition of the coin is the same at all angles from its center, then the “slice” in the case of a moving coin can be considered as a straight line cut through the coin, the cut intersecting the coin diameter normal to the cut at a distance along the diameter from one edge of the coin equal to the height of the effective field of the sensor above the floor of the coin path, although in practice the actual detected slice will follow a curved path as the coin rolls. If the composition of the coin is not the same at all angles around its center, then the pattern of variation of material detected by the sensor will depend on the actual curved slice which passes through the effective field and this will not be the same as the composition of a straight line cut through the coin.

Because the very small effective field size of the inductors allows the sensor to respond to the material of a slice through the coin, rather than responding to the material of the coin as a whole, these sensors can be used to detect coins with holes in the center and coins formed with a central disc of one material at an outer ring of another material. This provides an advantage over sensors of the type where the field is effectively coupled to the entire diameter of the coin, in which case the sensor cannot distinguish between a coin made up of two distinct parts with different compositions and a uniform coin of a material having the same magnetic or electrical properties as average property of the two-part coin.

If a sensor is arranged so that its effective magnetic field is concentrated at a position spaced substantially above the floor of the coin path, the sensor will respond differently to coins of different diameters. In addition to the fact that the sensor will distinguish between a coin large enough to interact with its field and a coin so small that it passes below the effective field, the sensor will distinguish between a bimetallic coin having a relatively small diameter, so that only the outer ring of the coin interacts with the effective field, and a coin having a larger diameter so that both the outer ring and the central disc interact in turn with the effective field of the sensor. Additionally, the sensor will be able to distinguish between a bimetallic coin in which the central disc is just big enough to interact with the effective field of the sensor, and a larger coin in which the central disc extends considerably above the position of the effective field of the sensor. In this case, the curve of a plot of the effect of the coin on the sensor against time will have different shapes for the different coins, with the proportion of the curve showing interaction with the central disc as opposed to interaction with the outer ring being greater for the larger coin.

The effect of a coin on the sensor or sensors may be analyzed by measuring the magnitude of the maximum effect (height of peak of the curve), by measuring the rate of change with time (slope of the curve) of the effect, by measuring the duration of an effect (width of peak of curve) or in any other convenient manner. The various measurements may be combined, e.g., in products or ratios. The shape of the curve of the effect plotted against time may be analyzed using curve fitting techniques. In all cases, the analysis results may be compared with pre-stored reference data to enable a validation decision to be taken. Known "fuzzy logic" approaches may be used to take the decision on the basis of more than one analysis result. The validation system may include a teachable neural network for learning the best approach to taking the validation decision.

In addition to the use of a single sensor, it is proposed to use sensing arrangements having multiple sensors, each with small effective fields, arranged at different heights. These sensors can be combined in a wide variety of different ways. For example, sensors at different heights above the floor of the coin path can be arranged at different positions along the coin path, so that at least the largest size of coin will interact with each sensor in turn. Coins of different diameters will give different sets of outputs from the succession of sensors, and such an arrangement can also be designed so as to be effective to distinguish between bimetallic and uniform composition coins of the same diameter. Additionally, two or more sensors may be arranged so that their effective fields are at substantially the same position along the coin path, but are at different heights. This concept may be combined with using sensors whose effective fields are spaced along the coin path, and several sensors having effective fields at different heights may be provided at several different positions along the coin path. The various different sensors may all be coupled to the same detection circuit, or separate detection circuits may be used for some or all of the sensors.

The arrangements using more than one sensor can provide highly effective systems for distinguishing between a wide variety of coins. For example, a sensor can be placed immediately above the floor of the coin path, so that it interacts only with the outer rim of the coin regardless of the coin diameter, and its output can be compared with the output from another sensor placed significantly higher, provided that either the sensors are connected to different detection circuits or the sensors are placed at different positions along the coin path. If the outputs of the two sensors are identical, the coin must have a small diameter such that it only just reaches the higher sensor. A larger diameter bimetallic coin will initially affect the higher sensor in the same way as it affects the lower sensor, as the outer ring of the coin interacts with the higher sensor, and will then affect the higher sensor differently as the central disc interacts with the higher sensor, and will then return to the original manner of interaction as the outer disc again interacts with the higher sensor. A larger diameter coin with a uniform composition will affect the higher sensor in the same manner as the lower sensor but for a longer time.

If several sensors at different heights are arranged at the same position along the coin path and are all connected to the same detection circuit it will not normally be possible to identify the effect of a coin on each individual sensor, and instead the curve of the combined effect on the detection circuit may have a complex shape which is difficult to predict. However, this does not matter provided that the arrangement is such that the overall effect of different coins on the detection circuit is sufficiently different that the coins can reliably be distinguished. It is not necessary to know the effects of a coin on the sensors in order to design a coin validation system to detect the coin, since the system can "learn" how to detect a coin by passing samples of valid coins through it while in a "training" mode, as is common in the art.

It is at present preferred to connect all the sensors to a single detection circuit, as this reduces the size and cost of the overall apparatus. Additionally, this tends to reduce the amount of computation required in the validation operation in the case where several sensors are positioned at the same point along the coin path, since it is not necessary to analyze the effect of a coin on each sensor individually. This reduces the time required for computation and is advantageous provided that the analysis which is performed is sufficient to distinguish satisfactorily between different coins.

It is presently preferred that the detection circuit, for detecting effect of a coin on an inductive sensor, comprises an oscillator connected to the sensor so that the inductance of the sensor affects the frequency of the oscillator. For example, the sensor may form part of an LC resonant circuit which controls the oscillator frequency. The oscillator frequency may be analyzed in an analysis circuit which measures the oscillator frequency by counting oscillations, and thereby obtains a succession of count values representing samples of the curve of the effect of a coin on the sensor plotted against time. These count values can then be analyzed digitally, e.g., in a microprocessor, in the various ways discussed above.

The size of the effective magnetic field of an inductive sensor can conveniently be defined with reference to a plane of measurement, which is the plane in which interaction between the coin and the magnetic field occurs, that is to say the plane of the coin as it passes along the coin path through the magnetic field. The size of the effective magnetic field can be defined as the maximum distance, in the direction within the plane of measurement but perpendicular to the direction of movement of the coin, between the points where the magnetic field strength falls to 50% of its maximum strength within the plane of measurement. This area will tend to contain the vast majority of the magnetic flux from the inductor which interacts with the coin, and the effect on the inductor of the interaction of the coin with the remainder of the magnetic flux in the plane of measurement is sufficiently small that the effect on the inductor can be regarded as arising substantially entirely from the part of the coin which lies within the area defined by the 50% of maximum field strength in the plane of measurement.

Magnetic flux from the inductor which does not reach the plane of measurement can be ignored, since this flux does not interact with the coin and therefore does not result in any effect of the coin on the inductor. However, it is generally desirable that as much as possible of the magnetic flux generated by the inductor passes through the plane of measurement, as any flux which fails to reach the plane of measurement tends to reduce the sensitivity of the inductor to passing coins.

In a typical case, in which the inductor of a sensor is mounted on one side of the side wall of a coin guide while the coin slides over the other side of the wall, the plane of measurement can be regarded as a plane approximately 1 mm from the face of the inductor. However, this spacing may vary depending on the thickness of the wall.

The size of the effective magnetic field of an inductive sensor is not necessarily similar to the size of the inductor coil in the corresponding direction. The size of the effective field can be influenced strongly by the design and construction of the inductor coil and any core, and may be either larger or smaller than the size of the coil depending on the inductor design.

It is particularly preferred that this aspect of the present invention is used with a frequency of oscillation applied to the inductive sensors which is no greater than 50 kHz, more preferably in the range of 5 to 30 kHz, and most preferably about 10 kHz.

According to this aspect of the present invention there is also provided a method of validating coins, comprising subjecting an input coin to the magnetic field of an inductive sensor which inductive sensor has an effective magnetic field the size of which is no greater than 12 mm (preferably no greater than 10 mm, more preferably no greater than 8 mm, most preferably no greater than 6 mm), and making a validation decision on the basis of the effect of the input coin on the inductive sensor or sensors. The size of the effective magnetic field is defined above with reference to a distance in the direction perpendicular to the direction of movement of the coin. However, it is preferred that the width of the effective magnetic field, defined in a corresponding manner but with respect to a distance in the direction of movement of the coin, is also no greater than 12 mm (preferably no greater than 10 mm, more preferably no greater than 8 mm, most preferably no greater than 6 mm), although it is not necessary for the size of the effective magnetic field and the width of the effective magnetic field to be the same.

This aspect of the invention can also be combined with the use of a capacitive sensor, either at the same position along the coin path as an inductive sensor or at a further position. Separate circuitry can be used to determine the effect of a coin on the capacitive sensor or the same circuitry can be used as for the inductive sensor or sensors.

This aspect of the present invention also provides a payphone using the coin validator, and the above method may be a method of validating coins in a payphone.

In another aspect, the present invention provides a coin validator having a coin guide for guiding input coins along a coin path, and a circuit board attached to or forming at least a part of a wall of the coin guide, the circuit board having a plurality of inductors mounted on it and having one or more conductive tracks formed on it interconnecting the inductors and/or connecting the inductors to other circuit components or to locations where wiring is provided for connection of the inductors to other circuit components, whereby the inductors form inductive sensors for use in sensing input coins in the coin path.

This aspect of the invention also provides a method of mounting inductors for use as inductive sensors in a coin validator, comprising providing a circuit board having a plurality of predefined mounting locations for the inductors and at least one conductive track interconnecting the said locations and/or connecting the said locations to predefined locations for other circuit components or to locations for connection to wiring for electrical connection to other circuit components, mounting the inductors at at least some of the predefined locations for them, and mounting the circuit board in a coin guide defining a coin path for input coins, such that the printed circuit board forms or is mounted to a side wall of the coin path.

This aspect of the present invention is particularly useful for mounting small inductors, such as the very small inductors which may be used to provide the very small effective magnetic fields used in the first aspect of the present invention. The circuit boards for the present aspect may be provided using printed circuit technology, and embodiments of this aspect of the present invention can provide a cheap manner of mounting the inductors used to form inductive sensors while ensuring accurate and repeatable placement of the inductors relative to the coin path. Accurate and repeatable placement of the inductors is important, particularly when the inductors are themselves small, if mass produced validators are to have reliable and consistent performance.

The inductors mounted on the circuit board may be connected in series or in parallel, or to separate detection circuits, or in any combination of these, at the convenience of the circuit designer and the circuit board layout designer. The circuit board may be provided with more locations for mounting inductors than are actually used in a particular case, in which case the unused locations may be left unconnected, or may be shorted, as required by the circuitry to which the inductors are connected.

Further aspects of the invention and optional features are set out in the claims.

The various aspects of the present invention and the preferred and optional features can be combined in a wide variety of arrangements, as will be apparent to those skilled in the art, and the present invention is not limited to the particular combinations of features discussed above or disclosed with reference to the illustrated embodiments.

BRIEF DESCRIPTION OF THE DRAWINGS

The embodiments of the present invention, given by way of non-limiting example, will now be discussed with reference to the accompanying drawings, in which.

DETAILED DESCRIPTION OF EMBODIMENTS OF THE INVENTION

Figure 1:
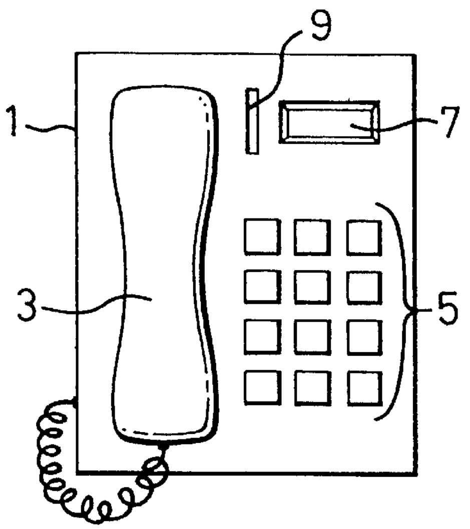
FIG. 1 shows a pay telephone.

FIG. 1 shows a pay telephone 1, having a handpiece 3, a set of keys 5, a display 7, and a slot 9 for the insertion of coins. In use, the keys 5 can be used for dialing telephone numbers and the handpiece 3 can be used for conducting a telephone conversation, provided that acceptable coins are inserted into the slot 9 to pay for use of the telephone. The display 7 is used to provide instructions to the user, and may also be used to display the telephone number dialed, show the present time and date, show the current amount of credit available to the user following the insertion of coins, and other functions which will be familiar to those skilled in the art. The keys 5 can also be used for programming telephone features in the pay telephone 1, such as barring calls to certain types of numbers, and for programming coin validation operations, such as training the coin validation system within the pay telephone 1 to recognize new types of coin and to set the length of telephone call time permitted for a given monetary value of inserted coins, as will be familiar to those skilled in the art.

Figure 2:
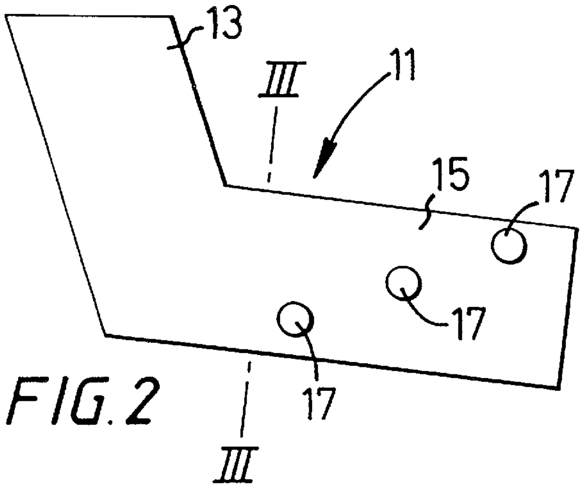
FIG. 2 is a side view of a coin guide in one embodiment of the present invention.

A coin which is inserted through the slot 9 enters a coin guide 11, shown in FIG. 2. The slot 9 prevents oversize coins from being inserted. The coin guide 11 guides the coin along a predetermined coin path. The input coin first falls down a steeply sloping arm 13 of the coin guide 11, and then enters a gently sloping arm 15 at a sharp corner. This design tends to cause all coins of the same denomination to pass along the gently sloping arm 15 with approximately the same speed, regardless of the speed imparted to the coin by the user when it is inserted into the slot 9.

As the coin rolls along the gently sloping arm 15 of the coin guide 11, it passes one or more inductive sensors 17, forming part of a coin validation system. In the embodiment of FIG. 2, three inductive sensors 17 are used. The validation system responds to the effect which the coin has on the inductive sensors 17, and determines whether the input coin is valid and what denomination it is, and this information is used by the call control system within the pay telephone 1 which monitors the amount of credit available to the user. Optionally, the result of the validation process may additionally be used to control a mechanical diverter at the end of the coin guide 11, so as to return rejected coins to the user. Optionally a capacitive sensor (not illustrated) may be provided in a manner known to those skilled in the art, either at the same position along the coin path as an inductive sensor or (more preferably) at a different position. In this case, the validation system can also take into account the effect of the input coin on the capacitive sensor.

Figure 3:
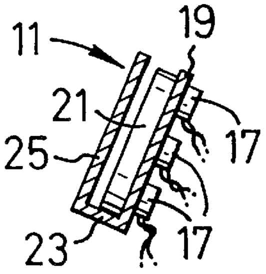
FIG. 3 is a section through the coin guide of FIG. 2.

FIG. 3 is a section through the gently sloping arm 15 of the coin guide 11, along the line III—III in FIG. 2. As shown in FIG. 3, the arm 15 tilts slightly to one side, so that a coin rolling down the arm 15 rests against one side wall 19 of the coin guide. The inductive sensors 17 are fixed to the other side of this side wall 19, so that only the thickness of the side wall 19 comes between the sensors 17 and a coin 21 in the gently sloping arm 15, as shown in FIG. 3.

The inductive sensors 17 comprise inductor coils connected to an oscillator circuit oscillating at about 10 kHz in the absence of any coin 21 in the coin guide 11. Consequently, any coin 21 passing the inductive sensors 17 will temporarily alter the effective inductance of the coils owing to the effect of the magnetic nature of the material of the coin 21 on the field generated by the coils of the inductive sensors 17. As can be seen in FIGS. 2 and 3, the inductive sensors 17 and the effective magnetic fields generated by them are much smaller than the diameter of the input coin 21, so that each inductive sensor 17 does not respond to the material of the coin 21 as a whole, but to the material of the narrow strip or slice through the coin defined by the region of the coin 21 which passes directly opposite the face of the respective inductive sensor 17. Preferably the size of the effective magnetic field of each inductive sensor 17, defined as the extent of the effective magnetic field in the direction parallel to the side wall 19 and at right angles to the path of movement of the coin 21 past the inductive sensors, is no greater than 8 mm. Satisfactory results have been obtained using one mH inductors, intended to be used to provide inductance in electronic circuits, sold by ECM Electronics of Penmaen House, Ashington, West Sussex, RH20 3JR, Great Britain under designation PK0406-102KS. These inductors are formed by a coil wound on a ferrite core, and have a diameter of about 5 mm. These were mounted with one end face of the core attached to the side wall 19 of the coin path, so that the coil axis is normal to the plane of the side wall 19. The field produced by these coils at a distance of 1 mm from this end face of the core was measured using a Hall effect probe while the coil was carrying a fixed DC current, and the effective field size was found to be 5.4 mm.

Acceptable results, though less good results, were also obtained using a similar 1 mH inductor having a diameter of approximately 8 mm, sold by Cirkit Distribution Ltd, Park Lane, Broxbourne, Herts, EN10 7NQ, Great Britain under designation Toko Coils 262LY102K. Its effective magnetic field was measured in a similar manner, and the size was found to be 8 mm.

It is particularly preferred that there should be at least one inductive sensor having an effective magnetic field size no greater than 12 mm, positioned so as to be spaced above the floor 23 of the coin guide 11 and to be spaced below the level of the top of the greatest height (diameter) coin which can be inserted through the slot 9, these spacings preferably being by at least 10% (more preferably at least 20%, most preferably at least 30%) of the length of the slot 9. By providing an inductive sensor 17 spaced from both the bottom and the top of the largest diameter coin, the sensor is arranged to respond to the material of a part of the coin away from its outer edge, at least in respect of the largest size of coin which can be inserted.

The use of an inductive sensor 17 having a very small effective field and spaced from both the top and the bottom of the largest size of coin can provide a system which is particularly useful for distinguishing between different sizes of bimetallic coins and for distinguishing between bimetallic coins and uniform composition coins of substantially the same size. Such a requirement may arise, for example, in payphones for use near the border between Mexico and USA, in which case the payphone must distinguish between a Mexican 1 peso coin (a bimetallic coin having an overall diameter of 21 mm, comprising a central disc of aluminum-bronze of 14 mm in diameter and an outer ring of stainless steel 3.5 mm wide), a Mexican 2 peso coin (a bimetallic coin having an overall diameter of 23.1 mm, comprising a central disc of aluminum-bronze of 15.8 mm in diameter and a stainless steel outer ring which is 3.65 mm wide), a Mexican 5 peso coin (a bimetallic coin having an overall diameter of 25.6 mm, comprising a central disc of aluminum-bronze of 17.2 mm in diameter and a stainless steel outer ring which is 4.2 mm wide) and a United States 25 cents coin (a uniform composition coin having a diameter of 24.3 mm, comprising a surface layer of copper/nickel alloy bonded to a copper core). The manner in which an inductive sensor of very small effective magnetic field size can distinguish between such coins is illustrated in FIGS. 4 and 5.

Figure 4:
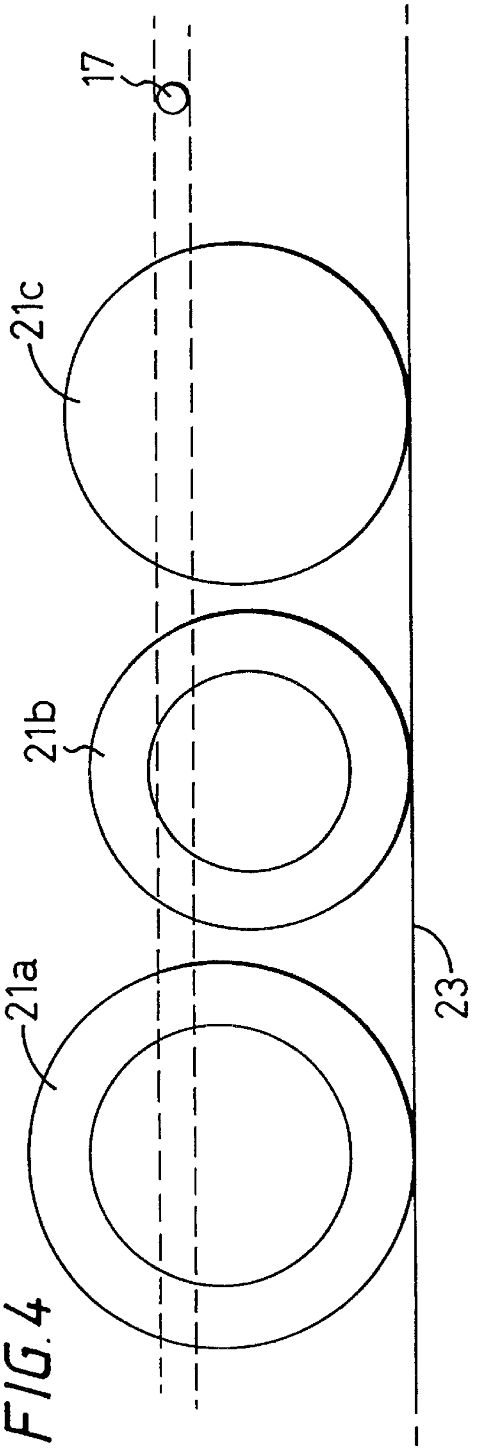
FIG. 4 shows the region of interaction of an inductive sensor in an embodiment of the present invention with three coins of different designs.

FIG. 4 shows a large diameter bimetallic coin 21*a*, a smaller diameter bimetallic coin 21*b*, and a uniform composition coin 21*c* having a diameter between the diameters of the bimetallic coins 21*a* and 21*b*. A small inductive sensor 17 is shown, and it is assumed that the size of the effective magnetic field of the inductive sensor 17 is the same as the diameter of the sensor. Consequently, the dotted lines in FIG. 4 show the strip or slice through the coins to which the inductive sensor 17 will respond. The inductive sensor 17 is spaced above the floor 23 of the coin guide so that its top comes just below the top of the central disc of the smaller bimetallic coin 21*b*.

Figure 5A:
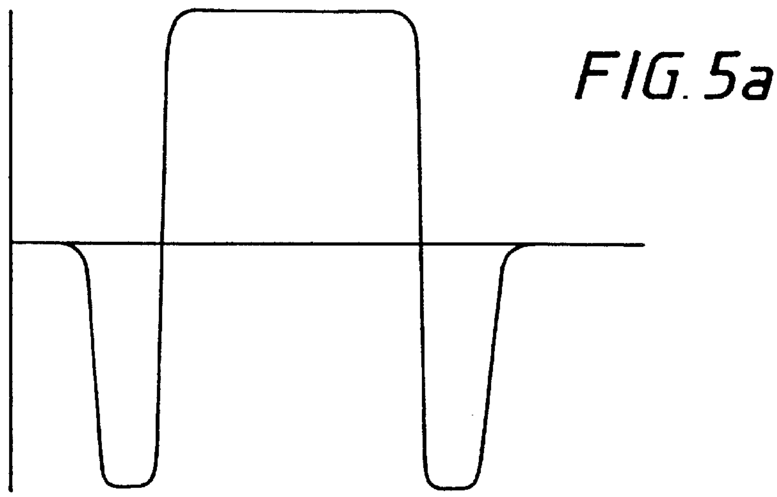
FIGS. 5*a*, 5*b* and 5*c* are respective curves, for respective ones of the three coins in FIG. 4, showing the change in inductance of the inductive sensor with time as the respective coin passes the sensor.
Figure 5B:
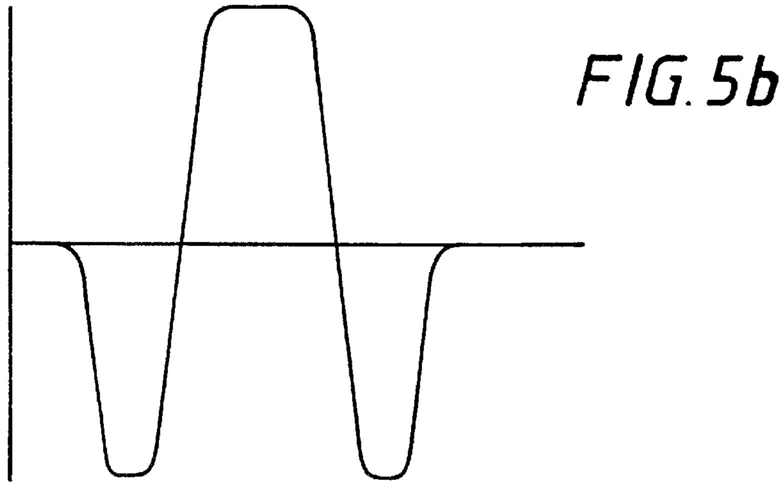
Figure 5C:
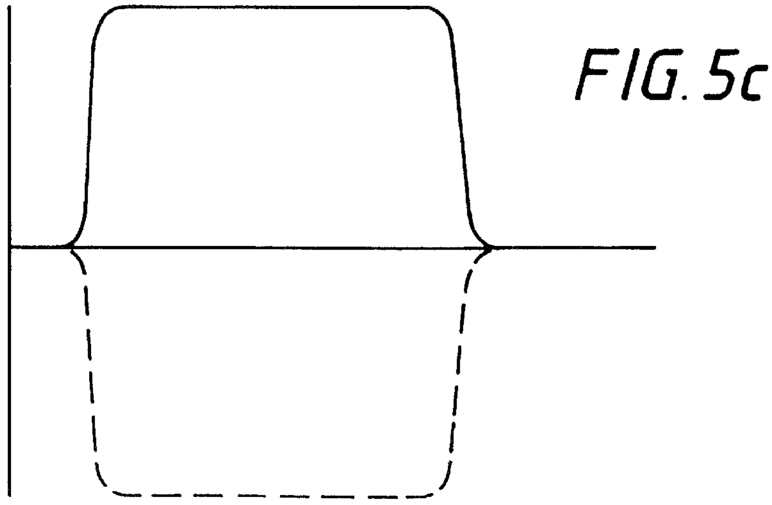

In FIGS. 5*a*, 5*b* and 5*c* it is assumed that the inductive sensor 17 is connected as part of an LC resonant circuit determining the frequency of an oscillator, so that changes in the inductance of the inductive sensor 17 change the frequency of the oscillator, and that in the bimetallic coins 21*a*, 21*b* the outer ring is ferromagnetic and the central disc is diamagnetic or paramagnetic. FIGS. 5*a*, 5*b* and 5*c* show the change of oscillator frequency with time as the respective coin passes the inductive sensor 17, and thus the effect of the coin on the inductive sensor 17.

In the case of the bimetallic coins, at first the outer ring of the coin interacts with the inductive sensor 17, and since this is ferromagnetic it increases the inductance of the sensor. This reduces the resonant frequency of the LC circuit, and therefore reduces the oscillator frequency. As the coin moves further, its central disc interacts with the inductive sensor 17 instead of the outer ring, and since this is diamagnetic or paramagnetic the inductance of the inductive sensor 17 is now reduced below its normal value and therefore the oscillator frequency increases to a value above its rest frequency. As the coin continues to pass the inductive sensor 17, its outer ring again interacts with the sensor and therefore the oscillator frequency falls below its rest frequency again, before finally returning to its rest frequency as the coin passes beyond the inductive sensor 17 entirely.

The response of the oscillator frequency to the uniform composition coin 21*c* is much less complex. If the material of the coin is diamagnetic or paramagnetic, the oscillator frequency rises while the coin is passing the inductive sensor 17, as shown by the continuous line in FIG. 5*c*. If the material of the uniform composition coin 21*c* is ferromagnetic, them the oscillator frequency falls as shown by the broken line in FIG. 5*c*.

It is clear from FIG. 5 that the shape of the plot of oscillator frequency against time for the bimetallic coins 21*a* and 21*b* is very different from the shape of the plot for the uniform composition coin 21*c*, and therefore the uniform composition coin 21*c* can be distinguished by a very simple analysis of the shape of these plots. There are also significant differences between the shapes of the plots in FIGS. 5*a* and 5*b* for the two bimetallic coins 21*a* and 21*b*. The plot for the smaller bimetallic coin 21*b* is slightly shorter, as it takes less time to pass the inductive sensor 17. However, this cannot be used as a means for distinguishing between the coins unless there is some way of ensuring that coins move at precisely uniform speed or a means is provided for measuring the coin speeds.

However, it can be seen that in FIG. 5*b* the periods during which the oscillator frequency is reduced are wider and the period during which the oscillator frequency is increased is narrower than the corresponding periods in FIG. 5*a*, and additionally the sloping portions of the plot are less steep in FIG. 5*b* than in FIG. 5*a*. Therefore these plots can be distinguished by analyzing such factors as the ratios of the widths of the different peaks and the ratio of the maximum slope against peak width.

These differences arise for the following reasons. The strip through the smaller diameter bimetallic coin 21*b* defined by the broken lines in FIG. 4 is further from the center of the coin and closer to the top of the coin than for the larger diameter bimetallic coin 21*a*. Therefore both the outer edge of the coin and the boundary between the central disc and the outer ring slope further from the vertical at the height of the inductive sensor 17 in the case of the smaller diameter bimetallic coin 21*b* than in the case of the larger diameter bimetallic coin 21*a*, and therefore the time taken for these lines to sweep across the full height of the sensor 17 is greater for the small diameter bimetallic coin 21*b*. This means that the transitions in the effective inductance of the inductive sensor 17 are slower and therefore the slopes in FIG. 5*b* are less steep. Additionally, because the outer ring of the small bimetallic coin 21*b* slopes more from the vertical at the height of the inductive sensor 17, its effective width in the direction parallel to the floor 23 of the coin guide is greater than the effective width of the outer ring of the larger diameter bimetallic coin 21*a*, whereas the width of the part of the central disc which interacts with the inductive sensor 17 is smaller for the smaller diameter bimetallic coin 21*b* because only the edge of the central disc interacts with the inductive sensor 17.

Figure 6:
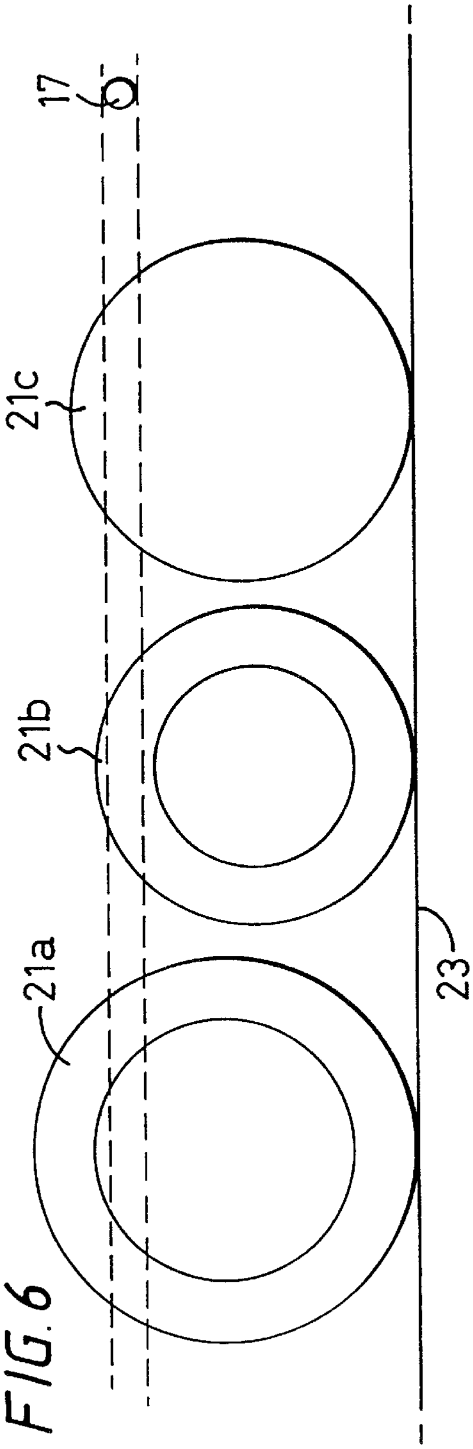
FIG. 6 is a view corresponding to FIG. 4, but for an inductive sensor positioned higher above the floor of the coin guide.
Figure 7A:
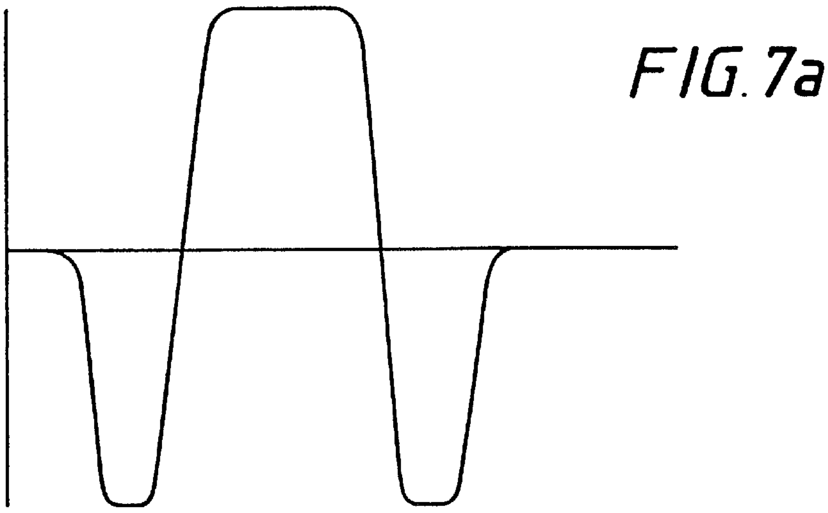
FIG. 7*a*, 7*b* and 7*c* correspond to FIGS. 5*a*, 5*b* and 5*c*, for the interaction of the respective coins with the sensor positioned as shown in FIG. 6.
Figure 7B:
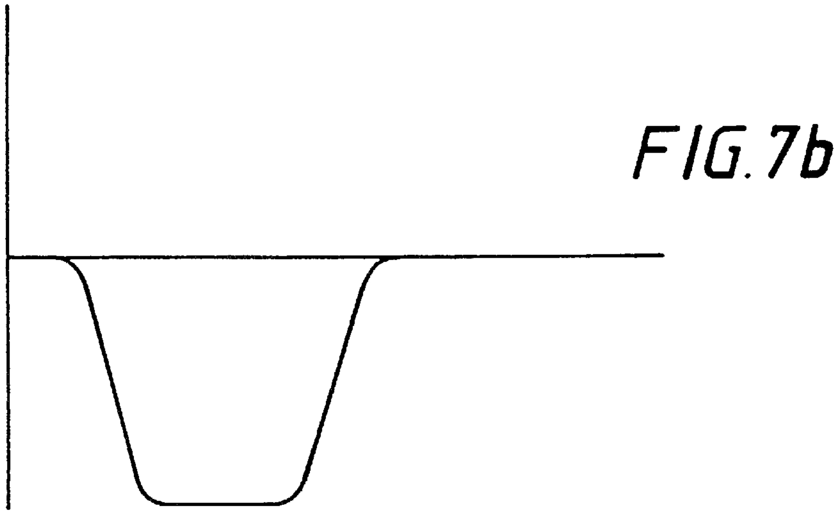
Figure 7C:
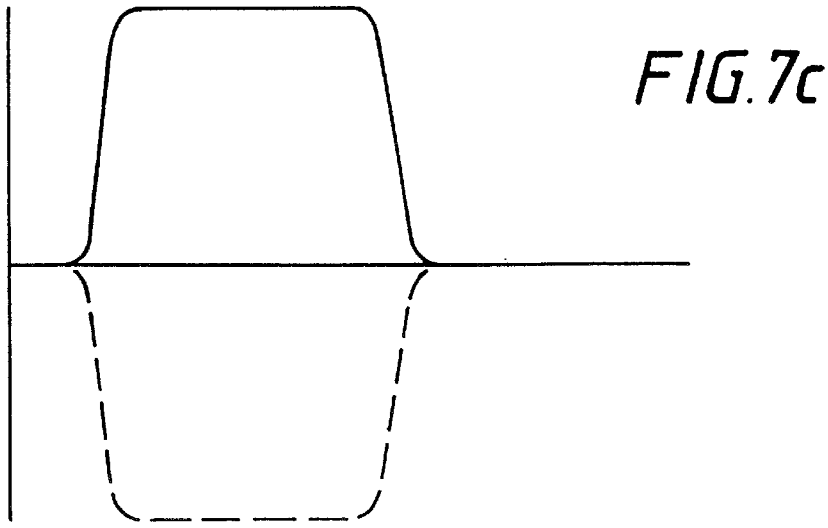

FIG. 6 is a drawing equivalent to FIG. 4 but for an inductive sensor 17 mounted higher above the floor 23 of the coin guide, so that it interacts only with the outer ring of the smaller diameter bimetallic coin 21*b* and the central disc of this coin passes entirely below the inductive sensor 17. However, the inductive sensor 17 interacts with both the outer ring and the central disc of the larger diameter bimetallic coin 21*a*. FIGS. 7*a*, 7*b* and 7*c* are curves corresponding to FIGS. 5*a*, 5*b* and 5*c*, in the case where the inductive sensor 17 is positioned as shown in FIG. 6. Because only the outer ring of the smaller bimetallic coin 21*b* interacts with the inductive sensor 17 in this case, the curve of FIG. 7*b* shows only a reduction in the oscillator frequency as the coin passes the sensor and no increase. This demonstrates how the effect of coins on a inductive sensor with a very small effective field can vary dramatically depending on the height at which the inductive sensor is positioned.

Figure 8A:
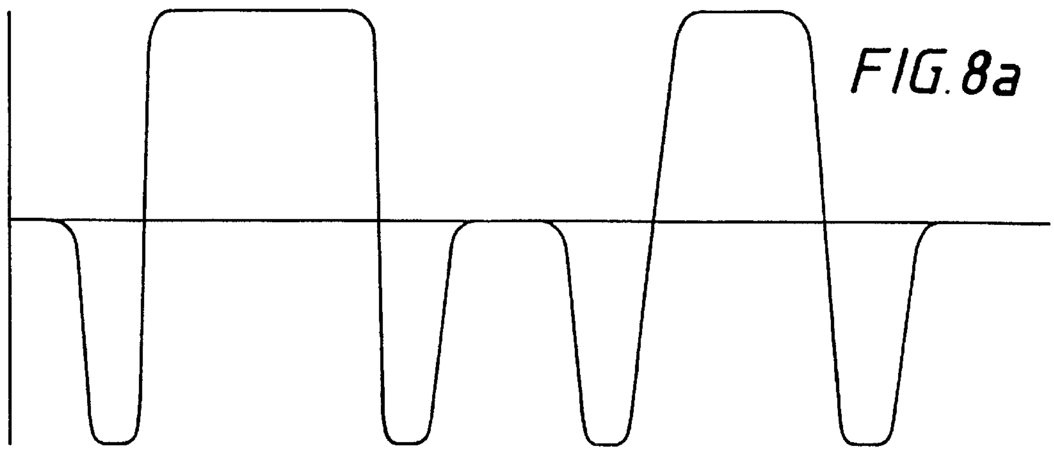
FIGS. 8*a*, 8*b* and 8*c* are respectively the concatenation of FIG. 5*a* with FIG. 7*a*, FIG. 5*b* with FIG. 7*b* and FIG. 5*c* with FIG. 7*c*, showing the outputs which can be obtained if a sensor at the height shown in FIG. 4 is followed by a sensor at the height shown at FIG. 6.
Figure 8B:
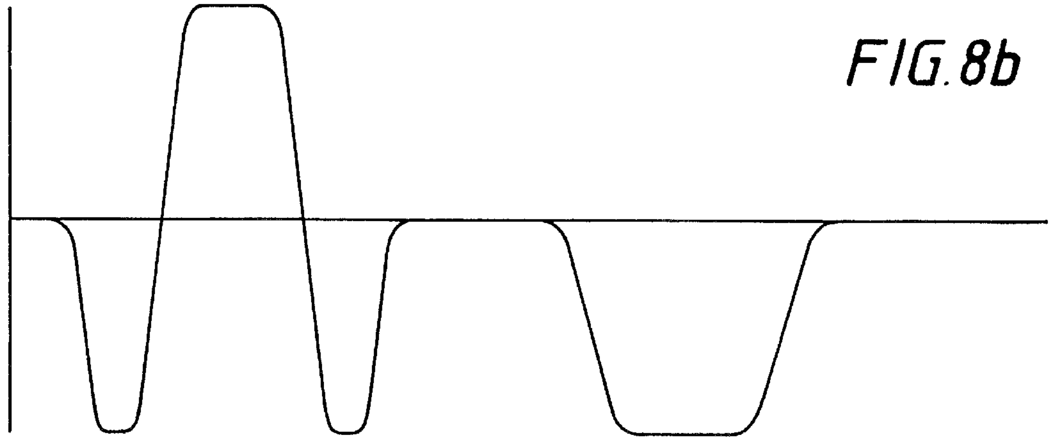
Figure 8C:
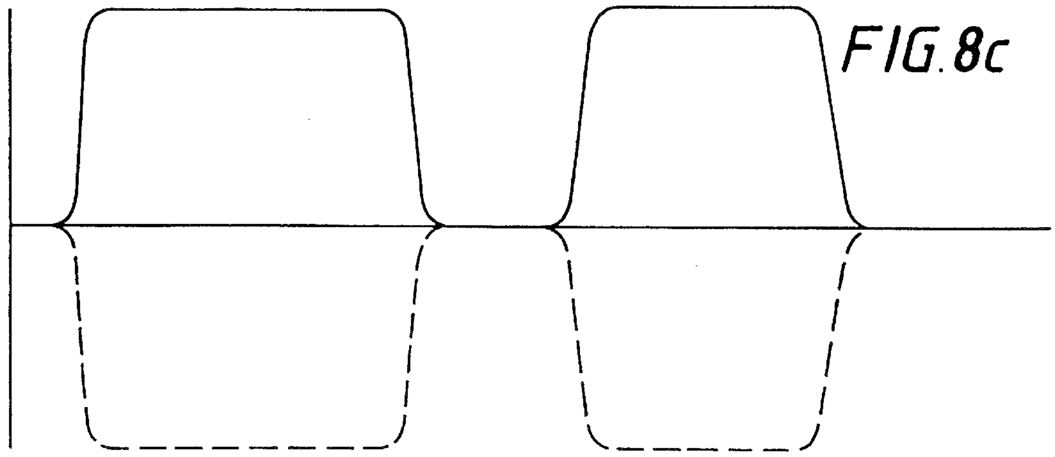

If desired, two or more small inductive sensors 17 can be used, placed at different heights and spaced along the coin path so that an input coin 21 affects the sensors in succession. FIGS. 8*a*, 8*b* and 8*c* show the effect on oscillation frequency of using an inductive sensor 17 positioned as shown in FIG. 4 followed by an inductive sensor 17 positioned as shown in FIG. 6, spaced along the coin path. As can be seen, the total effect of each coin on the oscillation frequency is quite different from the others. Accordingly, it can be seen that by using a plurality of small inductive sensors 17, a highly effective coin validation system can be provided.

Any desired combination of numbers and heights of sensors can be used, depending on the particular wishes of the designer of the validator and taken into account the intended market and therefore the range of coins which will be used. For example, the embodiment of FIG. 2 uses three inductive sensors 17 at different heights. The first is near the floor 23 of the coin guide, and therefore it detects the presence of all coins inserted through the slot 9, and also provides information about the magnetic nature of the material of the outer rim of the coin. The third sensor is position near the top of the gently sloping arm 15 of the coin guide 11, and acts principally to detect whether the diameter of an input coin reaches a predetermined value. The second sensor is positioned at an intermediate level, and is therefore capable of distinguishing between bimetallic and uniform coins and can distinguish between different diameters of bimetallic coins as discussed above.

In FIGS. 5 to 8 it is assumed that the size of the effective magnetic field of the inductive sensor 17 is less than the width of the outer ring of each bimetallic coin. With reference to the dimensions given above for Mexican coins, this means in practice that the size of the effective magnetic field should be not substantially greater than 3 mm. In practice, good quality results are obtained with larger fields, although it is preferred that the size of the effective magnetic field should not exceed 6 mm. In this case, the inductive sensor 17 is beginning to interact with the material of the central disc of a bimetallic coin even before the outer ring of the coin has begun to interact with the last part of the effective magnetic field to be reached. Additionally, depending on the height at which the inductive sensor is placed, it is more likely that the inductive sensor will be influenced to some extent by the material of the outer ring at all positions as the coin passes it, so that it is never influenced solely by the material of the central disc.

This means that the overall effect of the coin on the inductance of the inductive sensor 17 at any given position of the coin depends on the balance between the extent to which the sensor is interacting with the material of the outer ring and the extent to which it is interacting with the material of the central disc, and instead of the curves shown in FIGS. 5, 7 and 8, having flat tops and bottoms, the curves of oscillation frequency plotted against time will have curved peaks and troughs. In this case, the magnitudes of the peaks and troughs will also tend to vary depending on the size of the bimetallic coin, and these magnitudes can be used themselves as values representing which coin has been input. However, as the size of the effective magnetic field is progressively increased, there will tend to be a reduction in the magnitude of the various changes in inductance of the sensor (and therefore the magnitude of the various changes in oscillation frequency) as the coin passes, as the inductive sensor tends more and more to respond only to the overall average composition of the coin rather than responding to the central disc separately from the outer ring. That is why the size of the effective magnetic field should not exceed 12 mm, is preferably less than 10 mm and most preferably no more than 6 mm.

Figure 9:
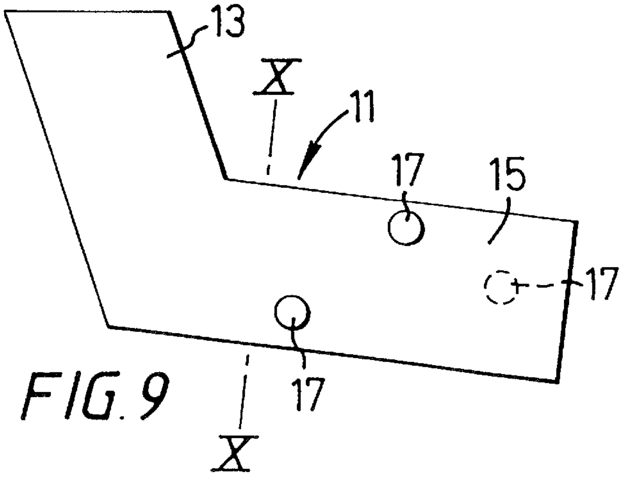
FIG. 9 is a side view of a coin guide in another embodiment of the present invention.
Figure 10:
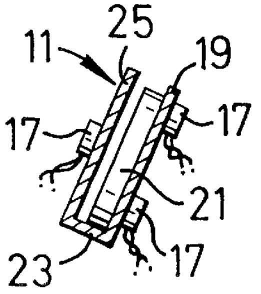
FIG. 10 is a section through the coin guide of FIG. 9.

An alternative embodiment is illustrated in FIGS. 9 and 10. FIG. 9 is a side view of the coin guide 11, and FIG. 10 is a section through the coin guide 11 along the line X—X in FIG. 9. In this embodiment, three inductive sensors 17 are used at different heights, but only two are mounted on the side wall 19 against which the coin 21 rests. The remaining sensor 17 is mounted on the other side wall 25 of the coin guide. Consequently, the magnitude of the effect of a coin on this sensor depends in part on the thickness of the coin 21, because the distance between the inductive sensor 17 and the coin 21 will depend on the thickness of the coin 21.

Figure 11:
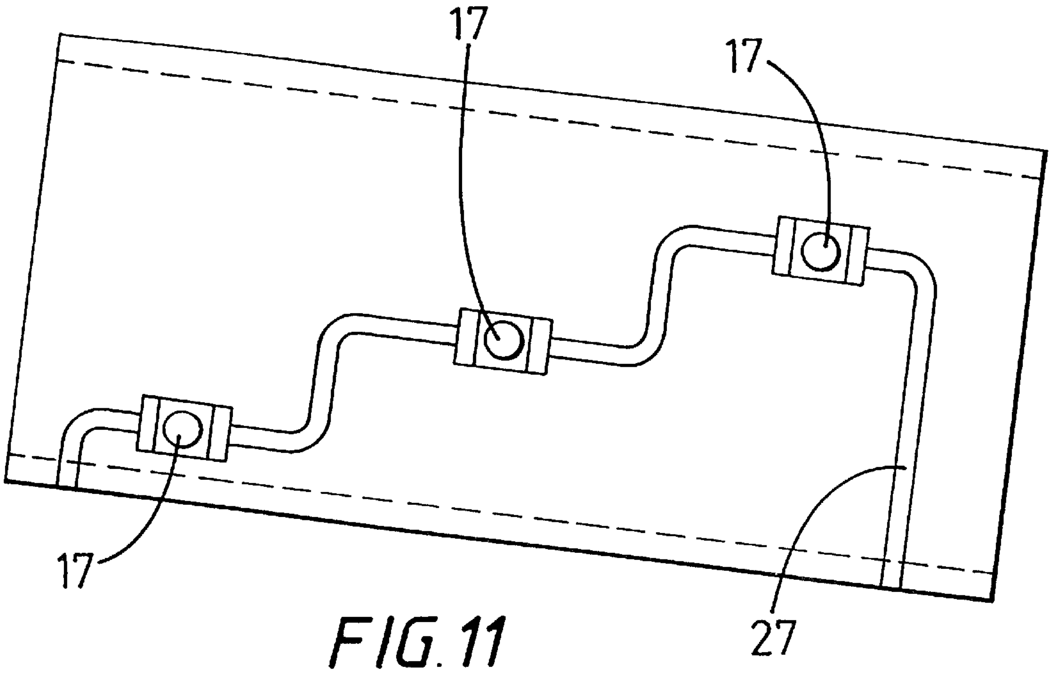
FIG. 11 shows a circuit board used as part of a side wall of a coin guide in a further embodiment of the present invention.
Figure 12:
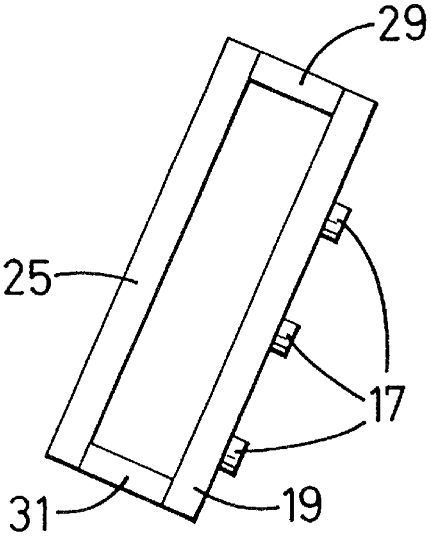
FIG. 12 is a section through the coin guide of the embodiment of FIG. 11.

FIG. 11 is a side view of a part of the coin guide in another embodiment of the present invention, and FIG. 12 is a section through a part of the coin guide shown in FIG. 11. In this embodiment, the illustrated part of the side wall 19 of the coin guide against which the coins rest is made from a printed circuit board, and surface mount inductors are used as the inductive sensors 17.

In surface mount technology a component either has metallized connection areas or has stiff metal connection legs, in either case designed to be soldered to respective connection areas on the same side of a circuit board as the body of the component. This technology has now partially replaced through-mount insertion technology, in which a component has stiff metal connection legs designed to be inserted through holes in a circuit board to be soldered to respective connection areas on the opposite side of the circuit board from the body of the component. In both technologies, because electrical connections are made using metallized areas or stiff legs, the design of the component defines a "footprint" or pattern of required connection areas on the circuit board. Footprint patterns and other aspects of surface mount devices and through-mount insertion devices have largely been standardized by JEDEC (Joint Electron Device Engineering Council) of the Electronic Industries Association in Washington D.C., U.S.A. These technologies can be contrasted with flexible wire connections, in which a component mounted on a circuit board or elsewhere is electrically connected to the circuit board by flexible wires. Because the wires are flexible, the design of the component in this case does not define a footprint pattern on the circuit board.

The surface mount inductors may be, for example 2.2 mH inductors type Murata LQN6C222M04 (available from Murata Electronics UK Ltd, 5 Armstrong Mall, Southwood, Farnborough, Hampshire GU14 ONR), sold for use as inductors in electronic circuits. These inductors are very small (about 5 mm long, 5 mm wide and 4.7 mm deep), and generate an effective magnetic field which extends for about 5 mm in the direction parallel to the side wall 19 and normal to the direction of movement of coins (and about 5 mm in the direction of movement). As shown in FIG. 11, the circuit board making up this part of the side wall 19 is designed to have a conductive track 27 (e.g., of copper) formed on it by normal printed circuit board techniques to provide the electrical connections to the inductive sensors 17. During manufacture of the coin guide, the surface mount inductors are mounted onto the printed board in the normal way for mounting circuit components. The pre-formed track 27 defines the positions at which the inductors are mounted. Accordingly, this technique provides a convenient and cheap method of manufacture while also ensuring that the inductive sensors 17 are provided at the desired positions on the wall 19 of the coin guide.

As shown in FIG. 12, this section of the coin guide is manufactured by attaching the printed circuit board forming the side wall 19 to another board, forming the other side wall 25, via spacers 29, 31 which provide a roof and a floor for the coin guide. If desired, the board forming the other side wall 25 could also be a printed circuit board, if it is desired to provide one or more inductive sensors 17 on that side of the coin guide, by analogy with the arrangement shown in FIGS. 9 and 10, or if it is desired to mount any other circuit components in this position.

Figure 13:
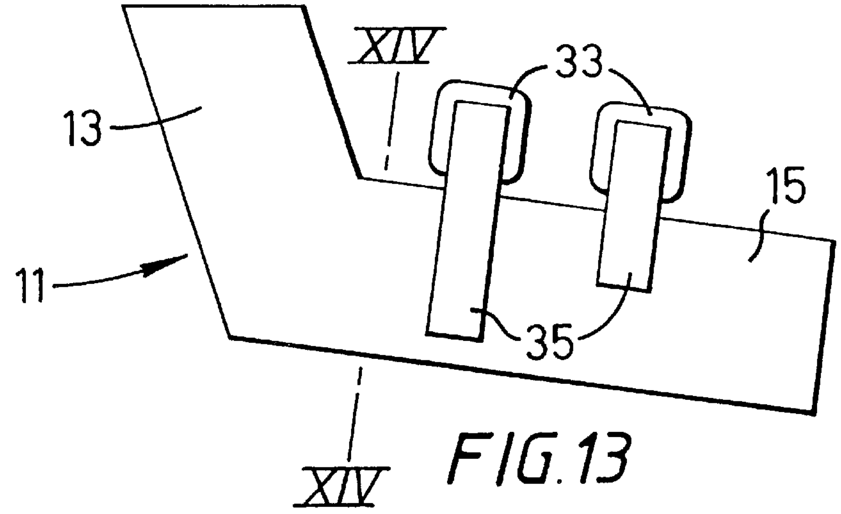
FIG. 13 is a side view of the coin guide in another embodiment of the present invention.
Figure 14:
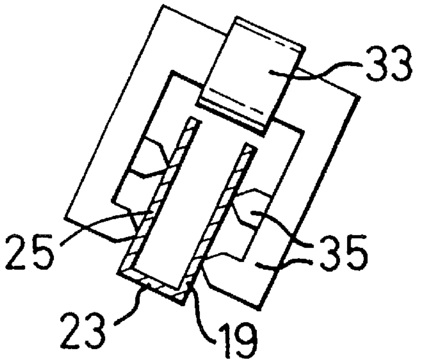
FIG. 14 is a section through the coin guide of FIG. 13.

In the embodiments discussed so far, the inductive sensors 17 have been provided by small inductors mounted directly on the side walls 19, 25 of the gently sloping arm 15 of the coin guide 11. However, it is also possible to use much larger inductor coils wound on ferrite cores, as shown in FIGS. 13 and 14. In this case the wound coils 33 are not mounted on a side wall of the coin guide 11. Instead, they are provided at any convenient position, such as above the coin guide, as shown in FIGS. 13 and 14. The ferrite cores 35 extend through the respective coils 33, alongside each side wall 19, 25 of the gently sloping arm 15 of the coin guide 11, and in towards the side walls 19, 25 so as to form respective magnetic circuits which are wholly within the ferrite cores 35 except where the magnetic circuits cross the coin path.

The ferrite cores 35 are arranged so that they have a small cross section (corresponding closely to the desired shape of the effective magnetic field) at their ends adjacent the side walls 19, 25. As shown in FIG. 14, the remainder of the ferrite cores 35 may be of much larger cross section, with the ends tapering to a small cross section as they approach the side walls 19, 25. Because the size of the effective magnetic field is defined by the shape of the ferrite cores 35, this embodiment allows a small effective magnetic field to be provided even though the wound coil 33 is of substantially greater diameter. Additionally, since the ferrite core 35 for a coil 33 approaches both sides of the coin guide 11, the size of the magnetic field is approximately the same at all positions across the width of the coin guide 11. However, this design is bulky and expensive to manufacture, and the large wound coil 33 will require greater electric power to drive it, compared with the inductors used as the inductive sensors 17 in the embodiments of FIGS. 3, 9 and 11, and for this reason this design is less preferred.

Those skilled in the art will be familiar with a variety of ways of measuring the effect of a coin on an inductive sensor. It is preferred at present to connect the inductive sensors 17 to electrical circuitry in the manner shown in FIG. 15. In this arrangement the inductive sensors 17 are connected across a capacitor 37 to form a resonant circuit. This resonant circuit is in turn connected as the frequency determining component for an electronic oscillator circuit 39. Accordingly, the oscillator circuit 39 outputs an oscillating signal at a frequency which is determined by the resonant frequency of the resonant circuit. The influence of a coin on an inductive sensor 17 will change the inductance of the inductive sensor 17, and this will change the resonant frequency for the resonant circuit, and this in turn will change the frequency of the signal output by the oscillator circuit 39.

The oscillating signal output by the oscillator 39 is provided to an analysis circuit which analyzes the changes in the oscillation frequency of the signal, and takes a validation decision on the basis of this analysis. One convenient way of measuring the frequency of the oscillating signal from the oscillator 39 is to count oscillations, thereby obtaining a succession of numerical values which can be analyzed using modern computing techniques, e.g., in a microprocessor. A circuit for implementing this approach is shown in FIG. 16.

Figure 16:
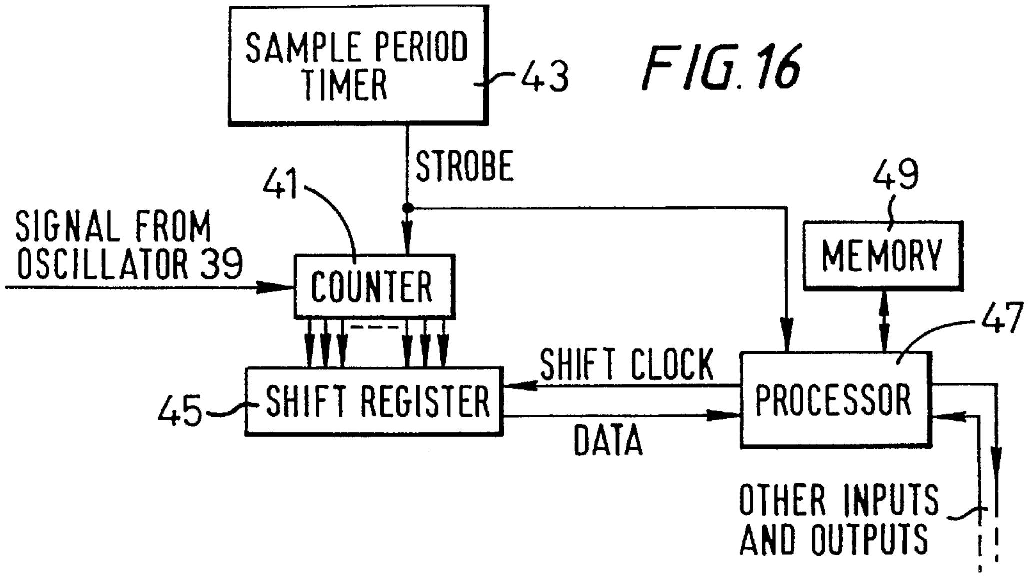
FIG. 16 shows an analysis circuit for analyzing the output of the circuit of FIG. 15.

In FIG. 16 the oscillating signal output from the oscillator 39 is input as the clock signal to a counter 41. A sample period timer 43 outputs a "strobe" signal at predefined intervals. The interval between two successive "strobe" signals is one sample period. During each sample period between "strobe" signals the counter 41 counts the oscillations of the signal received from the oscillator 39. In response to the "strobe" signal the current count value in the counter 41 is latched into a shift register 45 which receives the count value from the counter 41 in parallel. The count value in the counter 41 is then reset, so that the counter 41 begins counting the oscillations for the next sample period. The "strobe" signal is also provided to a processor 47, to inform the processor 47 that another sample period has expired and another count value is available in the shift register 45. In response to this "strobe" signal, the processor 47 outputs a shift clock to the shift register 45, and thereby clocks the value in the shift register 45 into the processor 47 as serial data. In this way, the processor 47 acquires a succession of numerical count values from the shift register 45, each representing the frequency of the oscillator 39 for a respective sample period. The processor 47 then analyses these numerical values and compares the analysis results with validation data previously stored in a memory 49, to make a validation decision.

The manner in which the validation decision is used depends on the way in which the processor 47 is integrated with other parts of the pay telephone 1. Normally, the validation result will be used to update a stored value representing the amount of credit available to the telephone user, and the processor 47 will also be monitoring the time spent on the telephone and will decrement the amount of stored credit accordingly. If the processor 47 does not control any of the other parts of the pay telephone 1, (for example it does not detect and respond to activation of the keys 5), the processor 47 may be programmed to inform the main processor of the pay telephone 1 when the available credit is lower than a preset value, so as to allow the main processor to place an "insert more coins" message on the display 7, and the processor 47 may be programmed to inform the main processor when all credit has run out so that the telephone call can be cut off or the processor 47 may be wired so that its output when all credit has expired is directly effective to cut off the telephone call. If the processor 47 also controls the other functions of the pay telephone 1, then the integration of outstanding credit information with the other telephone operations will be performed in the internal operations of the processor 47 rather than by communication with another processor.

Any desired technique may be used to analyze the numerical count values representing the frequency of the oscillator 39 and take the validation decision. For example, depending on the anticipated shape of the plot of count values against time for valid coins, the processor 47 may identify the highest and lowest count values obtained while a coin passes along a coin guide 11 (representing the peaks and troughs of the plots shown in FIGS. 5, 7 and 8), and these may be compared with prestored ranges which are acceptable as the maximum and minimum values for predefined valid coins. Instead of measuring the maximum and minimum count values, or in addition thereto, the processor 47 may also measure the width (i.e., the number of sample periods) of the peaks and troughs in the plot of count value against time, or may measure the rate of change of the count values (i.e., the slope of the plots shown in FIGS. 5, 7 and 8). Additionally, it may perform other types of analysis such as using known mathematical curve fitting techniques to identify the shape of the plot of count value against time or to measure how closely this shape matches a predetermined waveform. The various measured characteristics thus obtained may be combined with each other, for example, to form products or ratios, as desired by the designer of the system in any particular case. Additionally, the processor 47 may be arranged to use known neural network techniques to respond to a variety of such analysis results for the input coins and to learn, during a training operation with valid coins, which analysis techniques or combinations thereof provides the most reliable identification of a valid coin in any particular case. The processor 47 may be programmed to take validation decisions using known "fuzzy logic" decision techniques.

Preferably the processor 47 does not perform its analysis directly on the count values received from the shift register 45, but first takes the difference between the count values and a pre-stored reference value and performs its analysis on the difference values. Conveniently, the reference value may be the count value corresponding to the rest frequency of the oscillator 39 in the absence of an input coin, but other reference values can be used, such as lower value to ensure that all the difference values are positive even though the frequency of the oscillator 39 goes both above and below the rest value as a coin is sensed. The use of difference values means that the processor 47 performs its analysis on much smaller numbers than the count values. Additionally, count values received while no input coin is present allow the processor 47 to track any instability or drift in the rest frequency of the oscillator 39 and update the reference value accordingly so that the difference values are not substantially altered by such instability or drift.

As discussed above, the illustrated embodiments can be used at high or low oscillation frequencies for the current flowing in the inductive sensors 17. According to the normal construction of oscillator circuits, the frequency of the signal output from the oscillator 39 will be the same as the resonant frequency of the resonant circuit shown in FIG. 15, and therefore the same as the oscillation frequency of the inductive sensor 17. It is preferred that the oscillation frequency for the inductive sensor 17, and therefore the oscillation frequency for the oscillator 39, will be about 10 kHz. In order to obtain a sufficient number of oscillation frequency measurements while an input coin passes any given inductive sensor 17, so as to allow the shape of the plots shown in FIGS. 5, 7 and 8 to be determined sufficiently precisely for analysis, it is preferred that each sample period is about 10 ms long. Accordingly, there will be about 100 oscillations of the oscillator circuit 39 in each sample period. However, the effect of an input coin on the inductance of an inductive sensor 17 is normally so small that the change in the inductance of the inductive sensor 17 only changes the frequency of the oscillator 39 by a small proportion (typically less than 5%), especially if more than one inductive sensor 17 is connected in the resonant circuit determining the oscillation frequency of the oscillator 39. This means that the count value counted by the counter 41 in each sample period changes only by a very small number as a coin passes an inductive sensor 17. This makes it very difficult to measure the oscillation frequency changes precisely. For this reason, the analysis circuit as shown in FIG. 16 is preferably modified when low oscillation frequencies are used.

Figure 17:
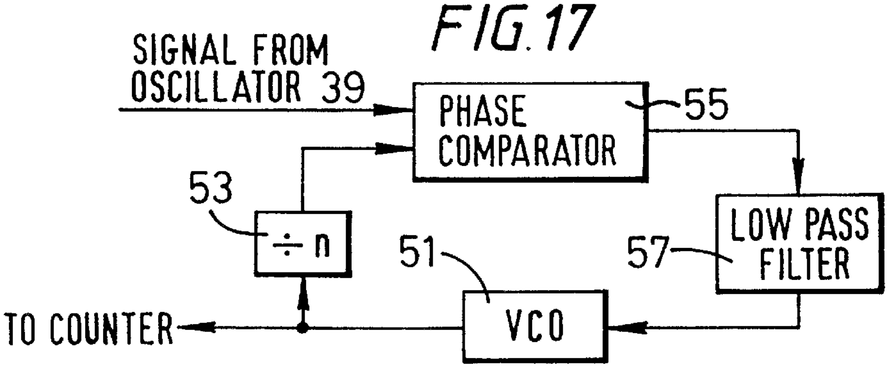
FIG. 17 shows a frequency multiplier circuit which can be inserted between the circuits of FIG. 15 and FIG. 16.

One modification is to place the circuit shown in FIG. 17 between the oscillator 39 and the analysis circuit of FIG. 16. The circuit of FIG. 17 is a stable frequency multiplier. In FIG. 17 a voltage controlled oscillator 51 generates an oscillating signal at a much higher frequency than the frequency of the signal from the oscillator 39, and this high frequency oscillating signal is passed through a frequency divider 53 (designed as digital divider circuit), which divides the frequency by a preset factor, to provide a low frequency signal at a frequency approximately the same as the signal from the oscillator 39. The signal from the oscillator 39 and the signal from the frequency divider 53 are provided as comparison inputs to a phase comparator 55. The output of the phase comparator 55 is filtered in a low pass filter 57, and is then provided as the frequency-controlling voltage to the voltage controlled oscillator 51.

In this way, the components of FIG. 17 provide a phase-locked loop which locks the frequency of the high frequency signal output from the voltage controlled oscillator 51 to the frequency of the low frequency signal from the oscillator 39. The frequencies from the two signals are linked by the division factor of the frequency divider 53. Consequently, as the frequency of the signal from the oscillator 39 alters, the frequency of the signal from the voltage controlled oscillator 51 alters in a similar manner. However, the frequency of the signal from the voltage controlled oscillator 51 could be, for example, of the order of 1000 times greater than the frequency of the signal from the oscillator 39. The signal from the voltage controlled oscillator 51 is input to the analysis circuit of FIG. 16 as the clock for the counter 41, and therefore much higher count values are obtained in each sample period. In this way, changes in the oscillation frequency of a fraction of a percent can be measured accurately.

Figure 18:
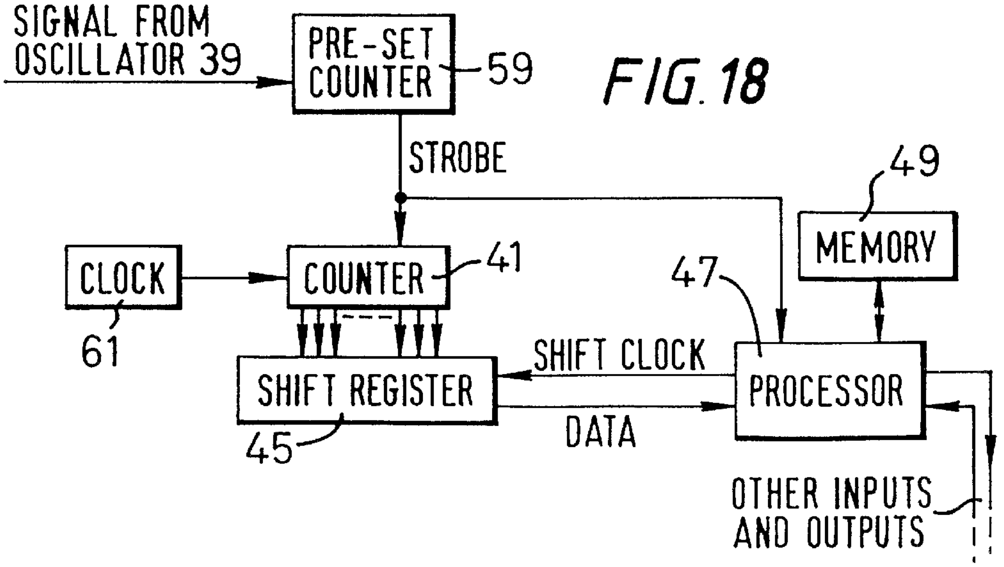
FIG. 18 shows an alternative analysis circuit for analyzing the output of the circuit of FIG. 15.

As an alternative, the analysis circuit of FIG. 16 may be replaced by the analysis circuit of FIG. 18. In this circuit the sample period timer 43 is replaced by a preset counter 59, and the signal from the oscillator 39 is input as a clock to the preset counter 59. A high speed constant clock (for example, a crystal oscillator) 61 provides the clock signal for the counter 41. The preset counter 59 counts the signals from the oscillator 39 until the preset value is reached, and then it outputs the "strobe" signal and resets itself. The preset value is selected so that the "strobe" signal is output approximately once every 10 ms, so as to provide sample periods of a comparable length to the sample periods in the circuit of FIG. 16. Therefore, if the oscillator 39 has a frequency of about 10 kHz the preset value for the preset counter 59 is about 100. However, as a coin causes changes in the frequency of the signal from the oscillator 39, the length of the sample periods in the circuit of FIG. 18 will vary because the time taken to reach the preset count value will vary.

During each sample period the counter 41 counts the number of oscillations of the high speed clock 61. This clock oscillates at a much high frequency than the frequency of the oscillator 39 (for example, about 100 to 1000 times the frequency). Consequently, much higher count values are obtained in the circuit of FIG. 18 than in the circuit of FIG. 16. Since the frequency of the high speed clock 61 is fixed, variations in the length of the sample period (caused by changes in the frequency of the oscillator 39) result in changes in the count value shifted from the counter 41 to the shift register 45. Therefore in this circuit the data obtained by the processor 47 from the shift register 45 represents the length of each sample period and in this way the values are indirectly measurements of the frequency of the oscillator 39.

Because of the high frequency of the high speed clock 61, changes of a fraction of a percent in the frequency of the oscillator 39 can be measured accurately. The processor 47 can analyze the successive count values using the same techniques as are discussed above for the circuit of FIG. 16, although the numerical values obtained in any particular case will be different for the two circuits, and this will be reflected in the prestored validation data in the memory 49.

If a capacitive sensor is also used, the same detection circuit and analysis circuit can respond to the effect of a coin on the capacitance of the capacitive sensor as is used to respond to the effect of a coin on the inductance of the inductive sensor or sensors. This result is achieved by connecting the capacitive sensor so as to provide some or all of the capacitance of the capacitor 37 in FIG. 15. In this way, changes in the capacitance of the capacitive sensor also change the resonant frequency of the resonant circuit and thus change the frequency of the signal output by the oscillator 39.

However, capacitive sensors normally function best if they are connected to receive an oscillating signal at a high frequency, i.e. above 100 kHz. The range of 1 MHZ to 10 MHZ is suitable, and typically a frequency of 3 to 6 MHZ may be used. Therefore it is preferred not to connect the inductive sensor 17 and the capacitive sensor to the same oscillator in the circuit of FIG. 15 in the case that a low frequency (e.g., 10 kHz) is required for the inductive sensor.

Figure 15:
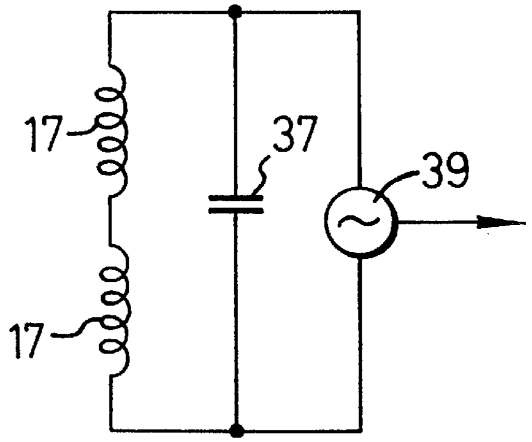
FIG. 15 shows an oscillator circuit for detecting changes in the inductance of the inductive sensors.

A very convenient circuit arrangement for accommodating an inductive sensor driven at a low frequency and a capacitive sensor at a high frequency may be provided by using two sensing circuits as shown in FIG. 15 with a modification of the circuit of FIG. 18, provided that the inductive sensor and the capacitive sensor are at different positions along the coin path. In this case, the first sensing circuit has a fixed capacitor 37 and is connected to one or more inductive sensors 17 as described with reference to FIG. 15. The oscillating signal output from the oscillator 39 in this circuit is input to the pre-set counter 59 as described with reference to FIG. 18. The second sensing circuit has a fixed inductor in place of the inductive sensors 17 in FIG. 15, and one or more capacitive sensors in place of some or all of the capacitor 37 in FIG. 15. This circuit replaces the high frequency clock 61 of FIG. 18, so that the oscillating signal output from the oscillator 39 in this sensing circuit is input to the counter 41.

While a coin is influencing one or more inductive sensors, but not influencing the capacitive sensor (or any of them if there is more than one), the output from the second sensing circuit is at its rest frequency, so that the second sensing circuit acts in the same way as the high frequency clock 61 and the analysis circuit functions as described with reference to FIG. 18. While a coin is influencing one or more capacitive sensors, but not influencing the inductive sensor or sensors, the output from the first sensing circuit is at its rest frequency, and the first sensing circuit in combination with the pre-set counter 59 act in the same way as the sample period timer 43 of FIG. 15. Accordingly, at this time the analysis circuit functions as described with reference to FIG. 15.

As will be apparent to those skilled in the art, this modification of FIG. 18 can also be used when the inductive sensors have large fields as in the prior art.

There can be a succession of a plurality of positions along the coin path at which inductive sensing takes place and a plurality of positions along the coin path at which capacitive sensing takes place, provided in any order as desired.

The above modification of FIG. 18 can also be used when an inductive sensor and a capacitive sensor are at the same position along the coin path, but this is not preferred owing to the possibility in this case that the simultaneous changes to the frequencies of both oscillators 39 might substantially cancel, so that the count value output from the counter 41 to the shift register 45 might not vary significantly from the value obtained when no input coin is present.

If it is desired to provide an inductive sensor driven at a high frequency, in addition to the inductive sensor driven at a low frequency, the high frequency inductive sensor can be connected to provide some or all of the inductance in the resonant circuit of the second sensing circuit. Similarly, an additional capacitive sensor, to be driven at a low frequency, could be connected into the resonant circuit of the first sensing circuit. However, it is unlikely that such a sensor would be desired since a low frequency resonant circuit will normally have a large fixed capacitance so that the effect of changes of the small capacitance of the sensor would be very difficult to measure.

The above modification of FIG. 18 is not essential even in the case that a high frequency capacitive sensor is used. The capacitive sensor could have sensing and analysis circuitry substantially separate from that used for the inductive sensor. For example, a separate sensing circuit according to FIG. 15 could be used with an analysis circuit according to FIG. 16 which is separate except for the processor 47 and memory 49. The processor 47 would in this case receive separate "strobe" signals and clock in count values from separate shift registers.

In the embodiments discussed above a plurality of inductive sensors have been used, each spaced from the next along the coin path. However, because each inductive sensor has a very small effective field, and is affected only by the composition of a part of the coin appearing at a particular height about the floor 23 of the coin guide, it is possible to provide two or more inductive sensors 17 at different heights at the same position along the coin path (or at positions sufficiently close together than an input coin will affect two or more inductive sensors 17 simultaneously). In this case, inductive sensors 17 may be provided only at one position along the coin path or at more than one position. If inductive sensors 17 are provided at more than one position along the coin path the arrangements of heights of the inductive sensors may be different at the difference positions, and the number of inductive sensors may be different.

It is possible for each inductive sensor to be connected to a separate sensing circuit (i.e., a separate oscillator if the approach of FIG. 15 is used), but this results in a very large quantity of data to be analyzed before a coin validation decision can be taken and also requires an increased amount of circuitry. Therefore it is preferred that the various inductive sensors at a particular position along the coin path are connected to a common sensing circuit, so that the effect of an input coin on the various sensors has a single composite effect on the sensing circuit. The nature of this composite effect, for any particular input coin, will depend on the choice of heights at which the inductive sensors 17 are placed, and this will also determine the manner in which the effect on the sensing circuit is different for different input coins. The relationship between the design of a coin, the choice of heights for the sensors and the composite effect on the sensing circuit is not always easy to predict, but simple trial and error will readily enable patterns of positions for the inductive sensors 17 to be found which will be effective for identifying particular coins and distinguishing between coins according to the requirements of any particular case.

Figure 19:
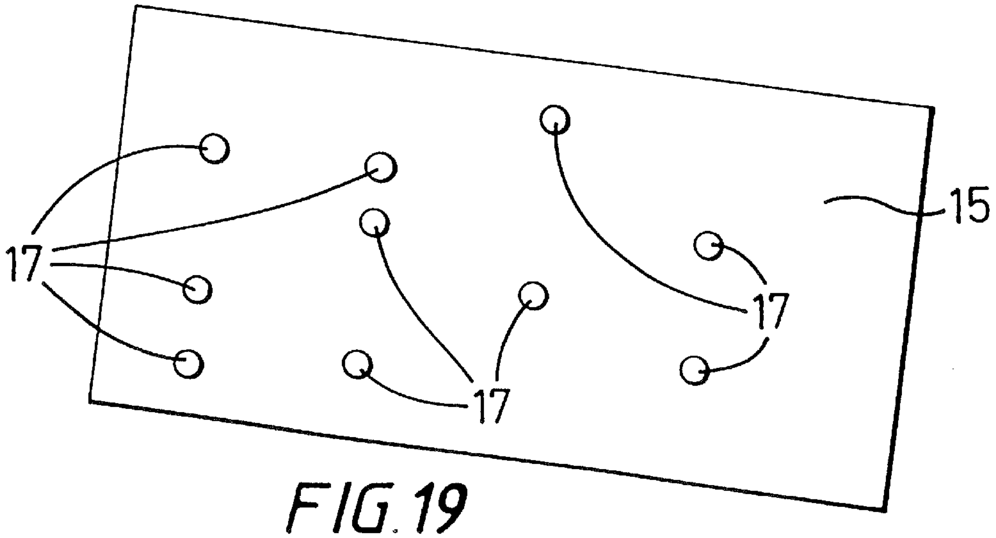
FIG. 19 shows an arrangement of inductive sensors on part of the side wall of the coin guide in yet a further embodiment of the present invention.

FIG. 19 illustrates a typical arrangement of inductive sensors 17 when this design approach is used. In FIG. 19 inductive sensors 17 are provided at four positions along the coin path, and at each position a plurality of inductive sensors 17 are used. At each of the first two positions there are three inductive sensors, and at each of the second two positions there are two inductive sensors. The overall arrangements of the heights of the sensors are different at the different positions, although one of the sensors at the first position is the same height as one of the sensors at the second position.

The change in the total inductance of the sensors at a particular position will change in a complex manner during the time taken for an input coin to pass the position, as the different inductive sensors at that position interact with different parts of the coin from each other and each sensor interacts with different parts of the coin at different times as the coin passes. Different sizes and constructions of coin will tend to create different patterns of change in overall inductance of the inductive sensors 17 at a particular position along the coin path, and the different arrangements of inductive sensors at the four different positions along the coin path will tend to produce different pattern of change of inductance from each other for the same input coin. Accordingly, the complete pattern of change of inductance with time as an input coin passes all of the inductive sensors shown in FIG. 9 (as measured for example with the circuits shown in FIGS. 15 to 18) will tend to be highly specific to the particular design of input coin and will enable different coins to be distinguished and will enable valid coins to be distinguished from fakes.

The embodiment of FIG. 11, using a circuit board with surface mounted inductors as part of the side wall 19 of the coin guide, is particularly suitable for arrangements of inductive sensors 17 of the type shown in FIG. 19, having more than one inductive sensor at the same position along the coin guide. The manufacture of the coin validation system can be facilitated by providing a circuit board prepared with conductive printed track 27 at various potential positions for the inductive sensors 17, and the designer selects which of the positions available on the circuit board will be used in any particular design. Consequently, the same design of circuit board can be used for a wide variety of arrangements of inductive sensors 17. However, it should be noted that, depending on the design of the printed circuit board and on the choice of positions for the inductive sensors 17, it may be necessary to provide jumpers or equivalent electrical connections at one or more other positions on the circuit board in order to complete the necessary electrical circuits.

Four examples of the design of such a printed circuit board are given in FIGS. 20 to 23. In each case, surface mountable inductors may be connected so as to provide the inductive sensors 17 at any one of five positions along the printed circuit board 65, and at any one of six heights at each position. In all of these figures it is assumed that all of the inductive sensors 17 will be connected to the same detection circuit for detecting the change in inductance of the inductive sensors 17 as a coin passes. In each of FIGS. 20 to 23, each position where an inductive sensor 17 can be provided is composed of a pair of spaced apart conductive contact pads for connection to the surface mountable inductor, such as the pair of contact pads identified by reference numeral 63. The pairs 63 of contact pads are connected to each other, and to interconnection pads 67 for connection to the rest of the circuit, by the printed tracks 27.

Figure 20:
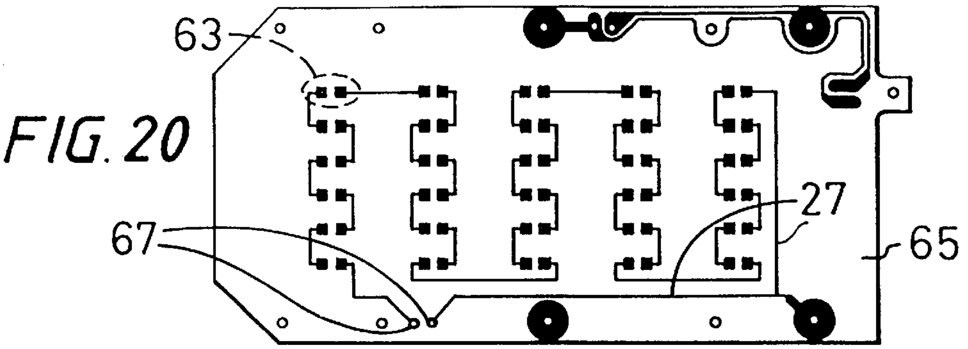
FIG. 20 shows a circuit board layout which may be useful for manufacturing the embodiment of FIG. 19.

In FIG. 20 all of the positions provided for inductive sensors 17 are electrically connected in series. This arrangement provides the largest percentage increase in the total inductance on the circuit board 65 when the inductance of one particular inductive sensor 17 increases. It has the disadvantage that electrical jumpers must be provided at every pair of contact pads where an inductor is not fitted, in order to complete the electrical circuit. This increases the manufacturing cost and time.

Figure 21:
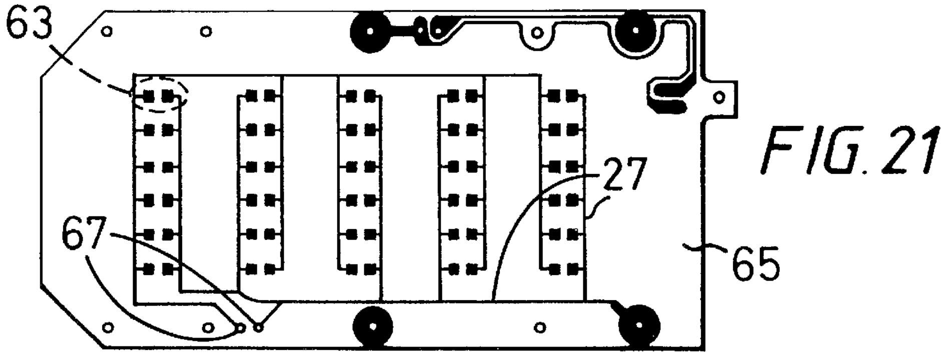
FIG. 21 shows a circuit board layout which is an alternative to FIG. 20.

By contrast, in the design of FIG. 21 all the positions for connection of the inductive sensors 17 are connected electrically in parallel. This means that each inductive sensor 17 completes the electrical circuit and no electrical jumpers need to be fitted. It provides the largest percentage decrease in the overall inductance on the circuit board 65 when the inductance of one of the inductive sensors 17 decreases.

Figure 22:
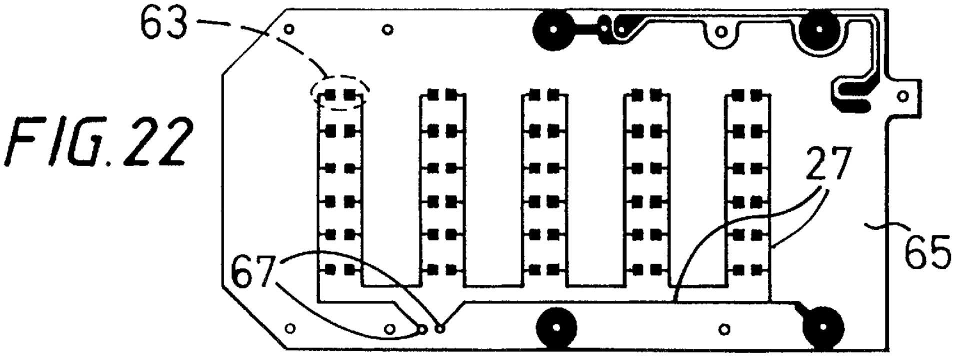
FIG. 22 shows another alternative circuit board layout.
Figure 23:
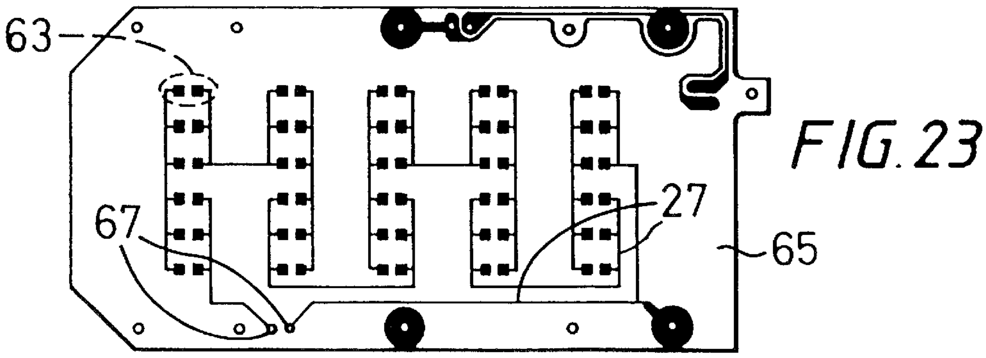
FIG. 23 shows yet another alternative circuit board layout.

The design shown in FIG. 22 is a compromise, in which all of the pairs of contact pads for inductive sensors 17 at the same position along the coin path are connected in parallel, but the sets of pairs of contact pads at different positions along the coin path are in series with each other. Accordingly, if at least one inductive sensor 17 is provided at one of the positions along the coin path, no electrical jumper needs to be fitted at the same position along the coin path, but if any of the five available positions along the coin path is not used, so that no inductive sensor 17 is fitted at any of the pairs of contact pads at that position, then at least one of the pairs of contact pads at that position along the coin path must be shorted using an electrical jumper. Other compromises between series and parallel connection may be provided, such as the arrangement shown in FIG. 23 in which the pairs of contact pads provided at each position along the coin path are divided into two groups, and the contact pads of each group are connected in parallel with each other but all of the groups are connected in series.

A wide variety of further possible arrangements and embodiments of the present invention will be apparent to those skilled in the art. Although the various optional features of the present invention have been discussed in connection with specific embodiments and arrangements, these optional features need not be present only in the combinations discussed and illustrated. The optional features may be combined in other ways as will be apparent to those skilled in the art and the use of any one optional feature does not imply the use of any other optional feature simply because the optional features concerned have been discussed in combination in the present specification.

It can be seen from the above discussion and the illustrated embodiments that the use of an inductive sensor 17 having a small effective field allows a new approach to coin validation, in which the validation system is enabled to respond to the material of a slice or swathe through the coin, and highly effective coin validation systems can be designed particularly using the preferred approach of providing inductive sensors at different heights above the floor of the coin guide at different positions along the coin path, either with one inductive sensor or with a plurality of inductive sensors at each position.

The particular pattern of the heights at which the inductive sensors 17 are placed at different positions along the coin path will be a matter to be determined by the designer depending on the circumstances under which it is anticipated that the coin validation system will be used. It may be necessary for some experiments to be carried out in order to identify a pattern of different heights which is particularly effective for identifying the desired coins and distinguishing them from likely fakes or invalid coins, but the following general design approaches may be useful in designing likely patterns of arrangement of the inductive sensors 17. These approaches can be used both in designs where there are a plurality of inductive sensors 17 at the same position along the coin path and where there is only one inductive sensor 17 at each position along the coin path.

An inductive sensor 17 placed very close to the floor 23 of the coin guide will respond only to the material of the outer rim of the coin, regardless of the diameter of the coin. By appropriate positioning of a sensor slightly above the floor, different effects may be obtained on the sensor from coins having different widths of outer rings of the same material.

An inductive sensor 17 placed near the top of the side wall 19 of the coin guide will also tend to respond only to the outer rim of the coin, but in this case the response depends also on the diameter of the coin.

An inductive sensor 17 spaced from the floor 23 of the coin guide and from the top of the side wall 19 (presumably by at least 10% of the length of the slot 9, more preferably by at least 20%) will respond to materials of both the outer ring and the center part of a coin at different times as the coin passes the sensor. Therefore an inductive sensor at this position is particularly effective for distinguishing between bimetallic coins and uniform composition coins of the same diameter. Additionally, an inductive sensor spaced from the top of the side wall 19 will tend to be influenced more by the outer ring of a relatively small diameter coin and more by the center of a relatively large diameter coin, and therefore this position is effective for distinguishing between bimetallic coins of different diameters.

An inductive sensor 17 placed above the floor 23 of the coin guide at precisely the mid-line of an anticipated coin is particularly effective for identifying coins with central holes.

I claim:

1. Coin validation apparatus comprising:

a) a coin guide for guiding an input coin along a predetermined coin path with one face of the input coin resting on a side wall of the coin guide;

b) at least one inductive sensor arranged to generate a magnetic field at a position along the coin path, for detecting a dimension of the input coin by interaction with the input coin;

c) circuit means for detecting an effect of the input coin on an inductance of the inductive sensor and making a decision whether the input coin is a predetermined coin or one of a predetermined set of coins;

d) at least a part of the side wall of the coin guide comprising a circuit board bearing at least one set of contact pads for surface-mounting a component thereto, and electrically conductive tracks for connecting the contact pads to one of other components on the circuit board and connection points for electrical connection to components not on the circuit board; and e) the inductive sensor comprising an inductor surface-mounted to the at least one set of contact pads.

2. Coin validation apparatus according to claim 1, in which the circuit board bears a plurality of said sets of contact pads arranged in a predetermined pattern, and at least one of said sets does not carry any component or carries an electrical connector for shorting its contact pads together.

3. Coin validation apparatus according to claim 2, in which said plurality of sets of contact pads are arranged in a plurality of columns.

4. Coin validation apparatus according to claim 1, in which the effective magnetic field of the inductive sensor has a size which is no more than 12 mm, a) wherein the size of the effective magnetic field of the inductive sensor is defined as a maximum distance, in a height direction of the coin guide, between points in a plane of measurement where the magnetic field has a strength which falls to 50% of its maximum field strength within the plane of measurement, b) wherein the height direction of the coin guide is defined as a direction perpendicular to a direction of the coin path and parallel to the plane of measurement, and c) wherein the plane of measurement is defined as a plane of the one face of the input coin which rests on said side wall of the coin guide.

5. Coin validation apparatus according to claim 1, in which the effective magnetic field of the inductive sensor has a width which is no more than 12 mm, and a) wherein the width of the effective magnetic field is defined as a maximum distance, in a direction along the coin path, between points in a plane of measurement where the magnetic field has a strength which falls to 50% of its maximum field strength within the plane of measurement.

6. Coin validation apparatus according to claim 1, in which the effective magnetic field of the inductive sensor has a size which is less than half of a diameter of the predetermined coin or of a smallest coin of the predetermined set of coins, a) wherein the size of the effective magnetic field of the inductive sensor is defined as a maximum distance, in a height direction of the coin guide, between points in a plane of measurement where the magnetic field has a strength which falls to 50% of its maximum field strength within the plane of measurement, b) wherein the height direction of the coin guide is defined as a direction perpendicular to a direction of the coin path and parallel to the plane of measurement, and c) wherein the plane of measurement is defined as a plane of the one face of the input coin which rests on said side wall of the coin guide.

7. Coin validation apparatus comprising:

a) a coin guide for guiding an input coin along a predetermined coin path with one face of the input coin resting on a side wall of the coin guide;

b) at least one inductive sensor arranged to generate a magnetic field at a position along the coin path, for detecting a dimension of the input coin by interaction with the input coin;

c) circuit means for measuring a magnitude of an effect of the input coin on an inductance of the inductive sensor and making a decision whether the input coin is a predetermined coin or one of a predetermined set of coins;

d) the effective magnetic field of the inductive sensor having a size which is no more than 12 mm;

e) the size of the effective magnetic field of the inductive sensor being defined as a maximum distance, in a height direction of the coin guide, between points in a plane of measurement where the magnetic field has a strength which falls to 50% of its maximum field strength within the plane of measurement;

f) the height direction of the coin guide being defined as a direction perpendicular to a direction of the coin path and parallel to the plane of measurement; and g) the plane of measurement being defined as a plane of the one face of the input coin which rests on said side wall of the coin guide.

8. Coin validation apparatus according to claim 7, in which the size of the effective magnetic field of the inductive sensor is no more than 8 mm.

9. Coin validation apparatus according to claim 7, in which the size of the effective magnetic field of the inductive sensor is no more than 6 mm.

10. Coin validation apparatus according to claim 7, in which the size of the effective magnetic field of the inductive sensor is no more than 5 mm.

11. Coin validation apparatus according to claim 7, in which the effective magnetic field of the inductive sensor has a width which is no more than 12 mm, wherein the width of the effective magnetic field is defined as the maximum distance, in the direction along the coin path, between the points in the plane of measurement where the magnetic field strength falls to 50% of its maximum field strength within the plane of measurement.

12. Coin validation apparatus according to claim 11, in which the width of the effective magnetic field of the inductive sensor is no more than 8 mm.

13. Coin validation apparatus according to claim 11, in which the width of the effective magnetic field of the inductive sensor is no more than 6 mm.

14. Coin validation apparatus according to claim 11, in which the width of the effective magnetic field of the inductive sensor is no more than 5 mm.

15. Coin validation apparatus comprising:

a) a coin guide for guiding an input coin along a predetermined coin path with one face of the input coin resting on a side wall of the coin guide;

b) at least one inductive sensor arranged to generate a magnetic field at a position along the coin path, for detecting a dimension of the input coin by interaction with the input coin;

c) circuit means for measuring a magnitude of an effect of the input coin on an inductance of the inductive sensor and making a decision whether the input coin is a predetermined coin or one of a predetermined set of coins;

d) the effective magnetic field of the inductive sensor having a size which is less than half of a diameter of the predetermined coin or of the smallest coin of the predetermined set of coins;

e) the size of the effective magnetic field of the inductive sensor being defined as a maximum distance, in a height direction of the coin guide, between points in a plane of measurement where the magnetic field has a strength which falls to 50% of its maximum field strength within the plane of measurement;

f) the height direction of the coin guide being defined as a direction perpendicular to a direction of the coin path and parallel to the plane of measurement; and g) the plane of measurement being defined as the plane of the one face of the input coin which rests on said side wall of the coin guide.

16. Coin validation apparatus according to claim 15, in which the size of the effective magnetic field is less than a third of said diameter.

17. Coin validation apparatus according to claim 15, in which the size of the effective magnetic field is less than a quarter of said diameter.

18. Coin validation apparatus according to claim 15, in which the effective magnetic field has a width which is less than half of said diameter, and a) wherein the width of the effective magnetic field is defined as the maximum distance, in the direction along the coin path, between the points in the plane of measurement where the magnetic field strength falls to 50% of its maximum field strength within the plane of measurement.

19. Coin validation apparatus according to claim 18, in which the width of the effective magnetic field is less than a third of said diameter.

20. Coin validation apparatus according to claim 18, in which the width of the effective magnetic field is less than a quarter of said diameter.

21. Coin validation apparatus according to claim 1, in which there are a plurality of said inductive sensors arranged to generate respective magnetic fields at different positions in a height direction of the coin guide from one other and at different positions along the coin path from one another.

22. Coin validation apparatus according to claim 1, in which there are a plurality of said inductive sensors arranged to generate respective magnetic fields at different positions in a height direction of the coin guide from one other and at the same position along the coin path as one another.

23. Coin validation apparatus according to claim 1, in which the inductive sensor is mounted on said side wall of the coin guide.

24. Coin validation apparatus according to claim 1, in which the coin guide comprises a second side wall, on the other side of the coin path from the first-mentioned side wall, and at least one further said inductive sensor is mounted on said second side wall.

25. Coin validation apparatus according to claim 1, further comprising an insertion slot through which input coins are input to the coin path, and at least one said inductive sensor being arranged to generate its magnetic field at a position spaced above a floor of the coin guide in a height direction by no more than 90% of a diameter of the largest diameter input coin which can be inserted through the insertion slot and guided along the coin path.

26. Coin validation apparatus according to claim 25, in which said position is spaced above the floor of the coin guide by no more than 80% of said diameter.

27. Coin validation apparatus according to claim 25, in which said position is spaced above the floor of the coin guide by no more than 70% of said diameter.

28. Coin validation apparatus according to claim 25, in which said position is spaced above the floor of the coin guide by at least 10% of said diameter.

29. Coin validation apparatus according to claim 25, in which said position is spaced above the floor of the coin guide by at least 20% of said diameter.

30. Coin validation apparatus according to claim 25, in which said position is spaced above the floor of the coin guide by at least 30% of said diameter.

31. Coin validation apparatus according to claim 1, in which the circuit means comprises means for causing an electric current in the inductive sensor to oscillate at an oscillation frequency, and thereby to cause the magnetic field to oscillate.

32. Coin validation apparatus according to claim 31, in which the oscillation frequency, in the absence of the input coin, is greater than 100 kHz.

33. Coin validation apparatus according to claim 31, in which the oscillation frequency, in the absence of the input coin, is less than 75 kHz.

34. Coin validation apparatus according to claim 31, in which the oscillation frequency, in the absence of the input coin, is less than 20 kHz.

35. Coin validation apparatus according to claim 31, in which the oscillation frequency, in the absence of the input coin, is about 10 kHz.

36. Coin validation apparatus according to claim 31, in which the circuit means comprises an oscillator connected to the inductive sensor so that a change in the inductance of the inductive sensor causes a change in the oscillation frequency of the oscillator, and the circuit means further comprises an analysis circuit for detecting and analyzing changes in the oscillation frequency in order to make said decision.

37. Coin validation apparatus according to claim 36 in which the analysis circuit is operative for counting a number of oscillations of the oscillator occurring in a predetermined period of time, or measuring the time taken for a predetermined number of oscillations of the oscillator to occur.

38. Coin validation apparatus according to claim 36, in which a) at least one capacitive sensor having a capacitance is provided to interact with the input coin, so as to affect the capacitance, at a position along the coin path, b) the oscillator is operative for outputting a first oscillating signal at the oscillation frequency, c) a second oscillator is provided for outputting a second oscillating signal, the second oscillator being connected to the at least one capacitive sensor so that a change in the capacitance of the capacitive sensor causes a change in the oscillation frequency of the second oscillating signal, the oscillation frequency of the second oscillating signal in the absence of the input coin being greater than the oscillation frequency of the first oscillating signal in the absence of the input coin, and d) the analysis circuit comprises:

i) a first counter for counting repeatedly a predetermined number of oscillations of the first oscillating signal to determine durations of a plurality of sample periods;

ii) a second counter for counting a number of oscillations of the second oscillating signal occurring in each said sample period to obtain count values; and iii) decision means for making the decision on the basis of the count values counted by the second counter.

39. Coin validation apparatus comprising:

a) a coin guide for guiding an input coin along a predetermined coin path;

b) at least one inductive sensor having an inductance arranged to generate an oscillating magnetic field, for interaction with the input coin, at a first position along the coin path;

c) at least one capacitive sensor having a capacitance arranged to interact with the input coin, so as to affect the capacitance, at a second position along the coin path; and d) circuit means for responding to an effect of the input coin on the inductance of the at least one inductive sensor and the capacitance of the at least one capacitive sensor and making a decision whether the input coin is a predetermined coin or one of a predetermined set of coins, the circuit means comprising:

i) a first oscillator circuit, connected to the at least one inductive sensor for passing an alternating current therethrough, and for outputting a first oscillating signal having a frequency which varies with variation in the inductance of the at least one inductive sensor, ii) an analysis circuit for counting oscillations of the first oscillating signal and for making the decision, iii) a second oscillator circuit, connected to the at least one capacitive sensor for passing an alternating current therethrough and for outputting a second oscillating signal having a frequency which varies with variation in the capacitance of the at least one capacitive sensor, the frequency of the second oscillating signal in the absence of the input coin being greater than the frequency of the first oscillating signal in the absence of the input coin, and iv) the analysis circuit comprising:

(a) a first counter for counting repeatedly a predetermined number of oscillations of the first oscillating signal to determine durations of a plurality of sample periods;

(b) a second counter for counting a number of oscillations of the second oscillating signal occurring in each said sample period to obtain count values; and (c) decision means for making the decision on the basis of the count values counted by the second counter.

40. Coin validation apparatus according to claim 39, in which the at least one inductive sensor connected to the first oscillator circuit is arranged to interact with the input coin at the first position along the coin path, and the at least one capacitive sensor connected to the second oscillator circuit is arranged to interact with the input coin at the second position along the coin path, the second position being spaced along the coin path from the first position.

41. Coin validation apparatus according to claim 39, in which the frequency of the second oscillating signal in the absence of the input coin is at least 10 times greater than the frequency of the first oscillating signal in the absence of the input coin.

42. Coin validation apparatus according to claim 39, in which the frequency of the second oscillating signal in the absence of the input coin is at least 100 times greater than the frequency of the first oscillating signal in the absence of the input coin.

43. Coin validation apparatus according to claim 1, in which the circuit means measures a peak change in the inductance of the inductive sensor caused by the input coin, and compares the peak change with a pre-stored table of reference values in order to make said decision.

44. Coin validation apparatus according to claim 1, in which the circuit means measures a parameter of a shape of a curve of the inductance of the inductive sensor against time, caused by the effect of the input coin on the inductive sensor, and compares the parameter with a table of pre-stored values in order to make said decision.

45. Coin validation apparatus according to claim 1, in which the circuit means comprises a neural network for making said decision.

46. A pay telephone, comprising:

a coin validation apparatus including a) a coin guide for guiding an input coin along a predetermined coin path with one face of the input coin resting on a side wall of the coin guide;

b) at least one inductive sensor having an inductance and arranged to generate a magnetic field at a position along the coin path, for detecting a dimension of the input coin by interaction with the input coin;

c) circuit means for detecting an effect of the input coin on the inductance of the inductive sensor and making a decision whether the input coin is a predetermined coin or one of a predetermined set of coins;

d) at least a part of the side wall of the coin guide comprising a circuit board bearing at least one set of contact pads for surface-mounting a component thereto, and electrically conductive tracks for connecting the contact pads to one of other components on the circuit board and connection points for electrical connection to components not on the circuit board; and e) the inductive sensor comprising an inductor surface-mounted to the at least one set of contact pads.

47. A pay telephone, comprising;

a coin validation apparatus including a) a coin guide for guiding an input coin along a predetermined coin path with one face of the input coin resting on a side wall of the coin guide;

b) at least one inductive sensor having an inductance and arranged to generate a magnetic field at a position along the coin path, for detecting a dimension of the input coin by interaction with the input coin;

c) circuit means for measuring a magnitude of an effect of the input coin on the inductance of the inductive sensor and making a decision whether the input coin is a predetermined coin or one of a predetermined set of coins;

d) the effective magnetic field of the inductive sensor having a size which is no more than 12 mm;

e) the size of the effective magnetic field of the inductive sensor being defined as a maximum distance, in a height direction of the coin guide, between points in a plane of measurement where the magnetic field has a strength which falls to 50% of its maximum field strength within the plane of measurement;

f) the height direction of the coin guide being defined as a direction perpendicular to a direction of the coin path and parallel to the plane of measurement; and g) the plane of measurement being defined as a plane of the one face of the input coin which rests on said side wall of the coin guide.

48. A pay telephone, comprising:

a coin validation apparatus including a) a coin guide for guiding an input coin along a predetermined coin path with one face of the input coin resting on a side wall of the coin guide;

b) at least one inductive sensor having an inductance and arranged to generate a magnetic field at a position along the coin path, for detecting a dimension of the input coin by interaction with the input coin;

c) circuit means for measuring a magnitude of an effect of the input coin on the inductance of the inductive sensor and making a decision whether the input coin is a predetermined coin or one of a predetermined set of coins;

d) the effective magnetic field of the inductive sensor having a size which is no more than 12 mm;

e) the size of the effective magnetic field of the inductive sensor being defined as a maximum distance, in a height direction of the coin guide, between points in a plane of measurement where the magnetic field has a strength which falls to 50% of its maximum field strength within the plane of measurement;

f) the height direction of the coin guide being defined as a direction perpendicular to a direction of the coin path and parallel to the plane of measurement; and g) the plane of measurement being defined as a plane of the face of the one input coin which rests on said side wall of the coin guide.

49. A pay telephone, comprising:

a coin validation apparatus including a) a coin guide for guiding an input coin along a predetermined coin path;

b) at least one inductive sensor having an inductance and arranged to generate an oscillating magnetic field, for interaction with the input coin, at a first position along the coin path;

c) at least one capacitive sensor having a capacitance and arranged to interact with the input coin, so as to affect the capacitance, at a second position along the coin path;

d) circuit means for responding to an effect of the input coin on the inductance of the at least one inductive sensor and the capacitance of the at least one capacitive sensor and making a decision whether the input coin is a predetermined coin or one of a predetermined set of coins, the circuit means comprising:

i) a first oscillator circuit, connected to the at least one inductive sensor for passing an alternating current therethrough, and for outputting a first oscillating signal having a frequency which varies with variation in the inductance of the at least one inductive sensor, ii) an analysis circuit for counting oscillations of the first oscillating signal and for making the decision, iii) a second oscillator circuit, connected to the at least one capacitive sensor for passing an alternating current therethrough, and for outputting a second oscillating signal having a frequency which varies with variation in the capacitance of the at least one capacitive sensor, and iv) the frequency of the second oscillating signal in the absence of the input coin being greater than the frequency of the first oscillating signal in the absence of the input coin; and v) the analysis circuit comprising:

(a) a first counter for counting repeatedly a predetermined number of oscillations of the first oscillating signal to determine durations of a plurality of sample periods;

(b) a second counter for counting the number of oscillations of the second oscillating signal occurring in each said sample period to obtain count values; and (c) decision means for making the decision on the basis of the count values counted by the second counter.

* * * * *